(12) United States Patent
Beltzer et al.

(10) Patent No.: US 11,346,703 B1
(45) Date of Patent: May 31, 2022

(54) POSITION SENSING WEIGHT MEASURING DEVICE

(71) Applicant: AMAZON TECHNOLOGIES, INC., Seattle, WA (US)

(72) Inventors: Dan Beltzer, Issaquah, WA (US); Matthew Ray Desjardien, Kenmore, WA (US); Stavan H. Dholakia, Shoreline, WA (US); Kenneth Edward Doe, Carnation, WA (US); Sergio Alfredo Phan Lung Li, Seattle, WA (US); Michael P. Mosman, Everett, WA (US); Paul Eugene Munger, Seattle, WA (US); Nathan Pius O'Neill, Snohomish, WA (US); Andrew James Pierce, Renton, WA (US); Robert M. Riggs, Lynnwood, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 66 days.

(21) Appl. No.: 16/588,886

(22) Filed: Sep. 30, 2019

(51) Int. Cl.
 *G01G 3/14* (2006.01)
 *G01G 19/414* (2006.01)
 (Continued)

(52) U.S. Cl.
 CPC ......... *G01G 3/1406* (2013.01); *G01G 3/1404* (2013.01); *G01G 19/00* (2013.01); *G01G 21/22* (2013.01); *G06Q 10/087* (2013.01)

(58) Field of Classification Search
 CPC .... G01G 3/1406; G01G 3/1404; G01G 19/00; G01G 21/23; G01G 19/4144; G01G 3/142–147; G06Q 10/087
 See application file for complete search history.

(56) References Cited

U.S. PATENT DOCUMENTS

| 5,254,992 A * | 10/1993 | Keen .................... G01D 3/0365 177/210 R |
| 6,843,109 B2 * | 1/2005 | Nakada .................. G01G 19/44 73/65.01 |

(Continued)

OTHER PUBLICATIONS

"74LVC4066 Quad bilateral switch Product Data Sheet", Nexperia, Rev.5, Nov. 2011, Retrieved from the Internet: https://assets.nexperia.com/documents/data-sheet/74LVC4066.pdf.

(Continued)

*Primary Examiner* — Randy W Gibson
(74) *Attorney, Agent, or Firm* — Lindauer Law, PLLC

(57) ABSTRACT

A platform is supported at four corners by four half-bridge load cells. Adjacent load cells are oppositely polarized. During operation, analog output from a pair of oppositely polarized half-bridge load cells is provided to an instrument amplifier. Analog output from the instrument amplifier is provided to an analog to digital converter to provide digital data. The digital data is then used to determine weight data indicative of a weight as measured by the pair of half-bridge load cells at that time. A set of switching elements, such as a quad bilateral switch controlled by a microcontroller, rapidly switch between pairs of oppositely polarized load cells. The weight data may be used to determine an overall weight change on the platform, such as a pick or a place of an item. Weight data from the four pairs of load cells may be used to determine a change in center of gravity.

21 Claims, 10 Drawing Sheets

(51) Int. Cl.
*G06Q 10/08* (2012.01)
*G01G 21/22* (2006.01)
*G01G 19/00* (2006.01)

(56) References Cited

U.S. PATENT DOCUMENTS

| | | | |
|---|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 9,473,747 B2 | 10/2016 | Kobres et al. |
| 2011/0011936 A1 | 1/2011 | Morandi et al. |
| 2012/0284132 A1 | 11/2012 | Kim et al. |
| 2013/0284806 A1 | 10/2013 | Margalit |
| 2015/0086107 A1 | 3/2015 | Dedeoglu et al. |

OTHER PUBLICATIONS

"INA317 Micro-Power (50-µA), Zero-Drift, Rail-to-Rail-Out Instrumentation Amplifier", Texas Instruments, SBOS896, Nov. 2017, Retrieved from the Internet: http://www.ti.com/lit/ds/symlink/ina317.pdf.

"TPD4E001 Low-Capacitance 4-Channel ESD-Protection for High-Speed Data Interfaces", Texas Instruments, SLLS682O, Revised Jul. 2019, Retrieved from the Internet: http://www.ti.com/lit/ds/symlink/tpd4e001.pdf.

"Ultra-low-power Arm® Cortex®-M4 32-bit MCU+FPU, 100DMIPS, up to 512KB Flash, 160KB SRAM, analog, audio, ext. SMPS", STLife.augmented,STM32L452xx, Data Production Sheet, DS11912 Rev 5, Jan. 2019, Retrieved from the Internet: https://www.st.com/content/ccc/resource/technical/document/datasheet/group3/fc/c2/8d/b7/99/d8/42/9e/DM00340549/files/DM00340549.pdf/jcr:content/translations/en.DM00340549.pdf.

Asthana, et al. "An Indoor Wireless System for Personalized Shopping Assistance" CiteSeerX, In Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sept. 17-21, 2011, 10 pages. Retrieved from the Internet: http://www.researchgate.net/publication/221568350_How_to_nudge_in_Situ_designing_lambent_devices_to_deliver_salient_information_in_super_markets.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: http://www.winlab.rutgers.edu/~janne/capacitivetouch_mobicom12.pdf.

* cited by examiner

POSITION SENSING WEIGHT MEASURING DEVICE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
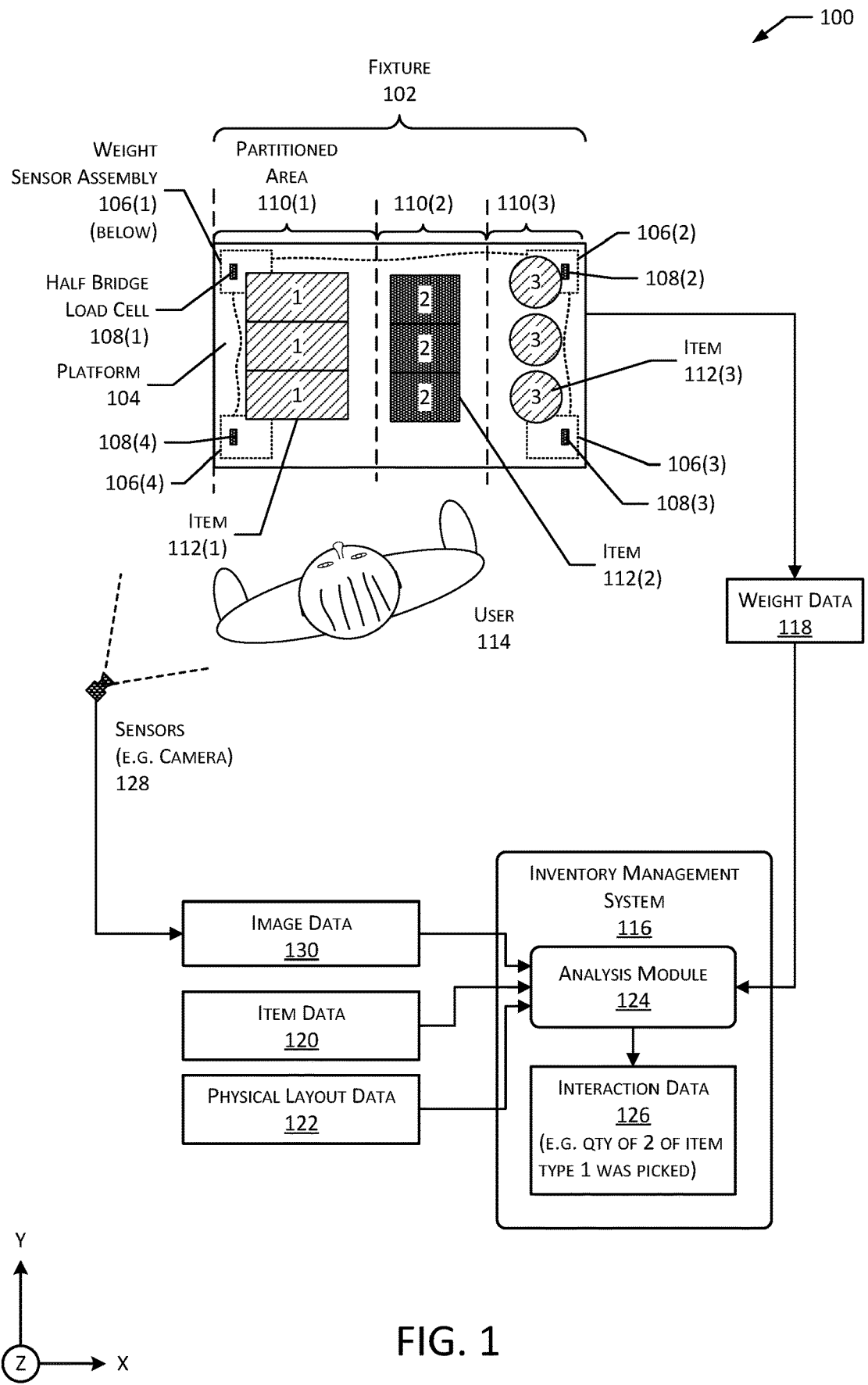
FIG. 1 illustrates a fixture with a weight sensor assembly that provides weight data to an inventory management system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures to stow or otherwise hold items. The fixture may comprise a platform, such as a shelf. Items may sit on the shelf, or may be contained in another structure, such as a bin, that is in turn supported by the shelf. The same type of item may be stowed on a single shelf, or items may be arranged into lanes. For example, a set of the same type of item that extends from the front of a platform to the back may be deemed a lane.

Users may perform interactions, such as removing or "picking" items from the platform or "placing" items onto the platform. These interactions change the total weight of the items on the shelf. For example, a "pick" will reduce the total weight on the shelf by the weight of the item which was removed. In another example, a "place" will increase the total weight on the shelf by the weight of the item that was put on the shelf. Information about the weight change from a first time to a second time may be used to determine whether an interaction is a pick or a place. In some implementations, if information about the weight of an item is known, a quantity of items involved in the interaction may be determined. For example, if the change in total weight is measured at −300 grams, and items are known to weigh about 100 grams, a pick of 3 items may be determined.

Additional information about the interaction may also be determined if weight values are measured at multiple points with respect to the platform. For example, if a weight sensor, such as a load cell, is located at each of the four corners of the platform, a center of gravity of the platform and the items on that platform may be determined at a given time using the four weight values from those weight sensors. Likewise, a change in weight may be used to determine where, with respect to the two-dimensional plane of the platform, a change in center of gravity took place. For example, an estimated location of where the item was picked from with respect to the platform may be determined. This information may be used to determine which lane is associated with the interaction.

A facility may have many fixtures. For example, a facility may have 100 shelving units, each with 7 shelves, resulting in 700 shelves to be provided with weight sensors. The facility may experience heavy use, and be subject to significant traffic and associated wear and tear. As a result, it is desirable for equipment to be as inexpensive as possible while still being physically robust and provide operationally useful data over a long lifespan with little or no maintenance.

The cost and complexity of weight sensors, such as load cells, is based on the type of usage, expected loads, desired resolution, and so forth. For example, a load cell that is able to output weight values with a 10 gram resolution and can support up to a 50 kilogram (kg) load may be significantly more expensive than a load cell with a 100 gram resolution and a maximum load of 5 kg. Load cell cost is significantly impacted based on the sensor technology used and the fabrication involved. For example, a load cell may comprise one or more strain gauges affixed to a support member, such as a beam or plate. The beam is attached at a first end to a support structure while a second end or "live" end supports the load being measured. Strain gauges affixed to the beam are stretched or compressed, depending on their positioning, slightly due to the change in shape of the beam and produce a change in electrical resistance. This electrical resistance may then be measured and ultimately used to determine the weight on the live end.

Depending on the various arrangements of the resistive strain gauges, a load cell may be described as "quarter-bridge", "half-bridge", or "full-bridge". Because the change in electrical resistance by the strain gauges may be very small, resistive strain gauges may be wired into a Wheatstone bridge arrangement that produces a voltage which changes in response to the changes in resistance. This change in voltage is more easily measured than the underlying small change in resistance. A "full-bridge load cell" has four resistive strain gauges, or their equivalent, affixed to a single beam. A "half-bridge load cell" (HBLC) has only two resistive strain gauges, or their equivalent, affixed to a single beam. A "quarter-bridge load cell" has only one resistive strain gauge, or its equivalent, affixed so a single beam.

During operation, a circuit including the resistive strain gauges is operated in the Wheatstone bridge arrangement. A full-bridge load cell uses a circuit which incorporates those four resistive strain gauges, and is able to provide as an output a voltage indicative of the weight. A pair of two HBLCs, each with an opposite polarity, may be combined to operate as a full-bridge load cell. Four single-bridge load cells may also be combined to operate as a full-bridge load cell.

As mentioned above, load cells are costly, and the cost is related to the number of strain gauge elements. For example, a single full-bridge load cell device is more expensive than a single half-bridge load cell device. Traditional systems attempt to minimize cost by using HBLCs or quarter-bridge load cells permanently wired to form a full-bridge circuit. For example, a scale may have four quarter bridge load cells, one on each corner, wired together to operate as a single full bridge load cell.

A significant drawback of such an arrangement is an inability to provide information about the weight on a specific load cell device. Returning to the example above, the scale with the four quarter-bridge load cells can provide information about the weight on the entire scale, but not how much weight is measured at a particular corner of the scale. As a result, it is not possible to determine a location of a center of gravity of the weight on the scale with this arrangement.

Described in this disclosure are apparatus that use multiplexed pairs of half-bridge load cells (HBLCs) that support a platform to provide weight data. The weight data may include weight values indicative of the weight at different physical locations with respect to the platform, as well as an overall weight of the platform and any load thereon. The apparatus allows the use of less costly HBLCs and other associated components, significantly reducing the overall cost. The apparatus may also be implemented in a modular configuration, allowing use with many different sizes of fixtures. This reduces the need for different models of devices, reducing engineering, development, production, and other costs.

With the apparatus, a platform is supported at four different locations, such as having a HBLC at each corner, for a total of four HBLCs. Adjacent HBLCs are oppositely polarized. For example, an electrical supply voltage to a first HBLC may be reversed relative to a second HBLC to provide the opposite polarity. During operation, switching circuitry connects a pair of oppositely polarized HBLCs to an instrument amplifier. The pair of HBLCs are now electrically equivalent to a full-bridge load cell.

Analog output from the instrument amplifier is provided to an analog to digital converter (ADC) to provide digital data. The digital data is provided to a microcontroller which determines weight data indicative of the weight as measured by the pair of HBLCs at that time. The switching circuitry, controlled by a microcontroller, switches between pairs of oppositely polarized HBLCs over some period of time. Continuing the earlier example, by switching between the four pairs of HBLCs, weight data is determined for a first side of the platform, a second side, a third side, and a fourth side. In an implementation using four HBLCs, each pair of HBLCs may be operated for $1/480^{th}$ of a second, with a measurement cycle of all four pairs being completed every $1/120^{th}$ of a second.

The weight data may be used to determine an overall change on the platform, such as a pick or place of an item. A total weight of the platform at a given period of time may be determined by summing the four weight values provided by the pairs during a measurement cycle. The four weight values in the weight data obtained by using the four pairs of HBLCs may be used to determine a center of gravity for that period of time.

In some implementations the apparatus may null out a previous weight value in the analog stage of the circuitry by providing an analog signal to a reference line of the instrument amplifier. As a result, the instrument amplifier would provide a non-zero output only when there is a change in the weight associated with that pair of HBLCs.

The ability to null out previous values and generate output when a weight change is detected may be used to reduce one or more of the power consumption or network bandwidth associated with operation of the apparatus. A weight change due to an interaction may be used to transition one or more portions of the apparatus from a low power mode ("sleep") to a higher power mode. This also allows the apparatus to minimize the use of network bandwidth. For example, the apparatus may be configured to send weight data only when a change in the weight data exceeds a threshold.

The apparatus utilizes less electrical power during operation compared to traditional systems. For example, at any given time less circuitry is energized compared to traditional systems, reducing overall power dissipation. During operations, the apparatus may utilize power that is stored such as from a battery or capacitor, or obtained from other sources such as photovoltaics, thermocouples, wireless power transfer, and so forth. The apparatus may include a wireless communication interface to send the weight data to another system. The wireless communication facilitates installation by reducing the capital expenses associated with installation and eliminating the need for installation and maintenance of cabling to each fixture.

The reduced power consumption also reduces the heat dissipation associated with operation of the system. Reduced power consumption and associated heat dissipation is advantageous for operation of the facility by reducing the cooling load associated with maintaining a desired ambient temperature in the facility or a portion thereof. For example, by minimizing heat dissipation, the apparatus may be used within a freezer environment without substantially warming the freezer environment and increasing the load on the refrigeration system.

The facility may include, or have access to, an inventory management system. The inventory management system may use data from the sensors at or near the fixture, such as the weight data from the apparatus, to determine interactions in the facility. Interactions may comprise the user picking an item from a fixture, placing an item at a fixture, touching an item, and so forth. For example, the inventory management system may generate interaction data that indicates what type and quantity of item a user picked from a particular part of the fixture, and then use this interaction data to adjust the count of inventory stowed at the particular fixture.

Other sensors may be used in the facility as well. In some implementations, cameras may acquire image data of the interaction. The image data may be processed to determine if the user picked an item, placed an item, identity of the item involved, determine a quantity involved in the interaction, and so forth. The image data may be used in conjunction with weight data from the weight sensors of the fixture to facilitate these determinations. For example, a weight change may indicate an event such as the user performing an interaction. Based on the weight change, image data that corresponds to that time may be subsequently processed. The weight data from the weight sensors, such as total weight change, weight changes at different locations with respect to the platform, location of the weight change, and so forth may also be used in conjunction with the image data to determine interaction data. For example, the weight data and the image data may be used by the inventory management system to assess hypotheses regarding possible interactions and discard those hypotheses which are inconsistent with the observed weight data.

The apparatus described in this disclosure provides several significant advantages. The use of less costly half-bridge load cells and associated reduction in complex electronics significantly reduces the overall cost of the apparatus. This reduced cost facilitates deployment.

The apparatus also provides weight data indicative of weights at different locations with respect to a platform, allowing for specific information as to the location of the weight change to be determined. For example, the change in center of gravity at a particular location may be determined and used to determine a particular lane. The inventory management system may look up which type of item is associated with that particular lane and determine a quantity of that type of item that was picked or placed based on the weight change. As a result, overall accuracy of the inventory management system is improved. Data from the apparatus may also be combined with information from other systems, such as the image data from cameras in the facility.

Illustrative System

FIG. 1 illustrates a system 100 with a fixture 102 having a weight sensor assembly 106 that provides weight data to an inventory management system, according to some implementations. A fixture 102 includes a platform 104, such as a shelf. A plurality of weight sensor assemblies 106 support the platform 104. Each portion of the weight sensor assembly 106 may comprise a half-bridge load cell (HBLC) 108. Each HBLC 108 may include a "live" end which supports the platform 104 and a fixed end affixed to a structure of the weight sensor assembly 106 or other structure under the platform 104. In other implementations the HBLC 108 may be integrated into the structure of the weight sensor assembly 106.

In this figure, four weight sensor assemblies 106(1), 106(2), 106(3), and 106(4) support the platform 104, each at a corner of the platform 104. For example, the HBLC 108(1) is located at or near a rear left corner, the HBLC 108(2) is located at or near a rear right corner, the HBLC 108(3) is located at or near a front right corner, and the HBLC 108(4) is located at or near a front left corner. In other implementations, other placements of HBLCs 108 may be utilized. Adjacent HBLCs 108 are oppositely polarized. For example, an electrical supply voltage to the HBLC 108(1) may be reversed relative to the HBLC 108(2) to provide the opposite polarity.

During operation, multiplexed pairs of HBLCs 108 having opposite polarity are used to determine weight data at different portions of the platform 104. The weight data may include weight values indicative of the weight at different physical locations with respect to the platform 104, as well as an overall weight of the platform and any load thereon.

Switching circuitry connects a pair of oppositely polarized HBLCs 108 to an instrument amplifier. The pair of HBLCs 108 are now electrically equivalent to a full-bridge load cell. Continuing the example, pairings of the HLBCs 108 used during operation may be as follows at the following times:

TABLE 1

| Time | First HBLC | Polarity of First HBLC | Second HBLC | Polarity of Second HBLC |
| --- | --- | --- | --- | --- |
| 1 | 108(1) | + | 108(2) | − |
| 2 | 108(1) | + | 108(4) | − |
| 3 | 108(3) | + | 108(2) | − |
| 4 | 108(3) | + | 108(4) | − |

Analog output from the instrument amplifier is provided to an analog to digital converter (ADC) to provide digital data associated with that time. The digital data is provided to a microcontroller which determines weight data indicative of the weight as measured by the pair of HBLCs 108 at that time. The switching circuitry, controlled by a microcontroller, switches between pairs of oppositely polarized HBLCs 108 over some period of time. Continuing the earlier example, by switching between the four pairs of HBLCs, weight data is determined for a first side of the platform 104, a second side, a third side, and a fourth side. In an implementation using four HBLCs 108, each pair of HBLCs may be operated for $1/480^{th}$ of a second, with a measurement cycle of all four pairs being completed every $1/120^{th}$ of a second. The apparatus is discussed in more detail at least with regard to FIGS. 2-6.

The fixture 102 may be divided into one or more partitioned areas 110. A partitioned area 110 is an area upon the fixture 102 that is associated with a particular type of item 112. For example, the fixture 102 depicted here has three partitioned areas 110(1), 110(2), and 110(3). Partitioned area 110(1) may be associated with storing some quantity of item 112(1) such as cat food, while partitioned area 110(2) may be associated with storing some quantity of item 112(2) such as dog food, and partitioned area 110(3) may be associated with storing some quantity of item 112(3) such as fish food.

The weight sensor assemblies 106 described herein may be used with regard to other types of fixtures 102, such as racks, hangers, bins, and so forth. For example, a bin or set of bins may be supported by six weight sensor assemblies 106(1)-(6).

A user 114 may interact with the fixture 102 or the partitioned areas 110 at the fixture 102. For example, the user 114 may remove item 112(1) from the partitioned area 110(1). The user 114 may then return the item 112(1) to the fixture 102. Different users 114 may interact with the same fixture 102.

An inventory management system 116 may be configured, as described below, to perform various functions with regard to a facility. To perform these functions, the inventory management system 116 may accept weight data 118 indicative of the weight as measured by the weight sensor assemblies 106. For example, the weight sensor assemblies 106 may send weight signals to a computing device of the fixture 102 that then generates the weight data 118, which includes weight values and timestamps indicative of when those weight values were obtained. In some implementations, the weight sensor assembly 106 or other computing device of the fixture 102 may provide various functions, such as filtering or otherwise conditioning the weight signals, generating and transmitting the weight data 118, and so forth.

The inventory management system 116 may maintain and utilize item data 120 and physical layout data 122. The item data 120 comprises information about a particular type of item 112. The item data 120 may include information indicative of a weight of a single item 112, or a package, kit, or another grouping considered to be a single item 112. The item data 120 may include other characteristics of that type of item 112 such as: physical dimensions, characteristics about how the item 112 appears, and so forth. For example, the item data 120 may comprise a plurality of local descriptor values generated by feature extraction algorithms, parameters for classifiers, neural network configuration data, and so forth, that characterizes the appearance of a representative one or more of the item 112. The item data 120 may indicate the types and quantities of items 112 that are expected to be stored at that particular fixture 102 such as in a particular lane on a fixture 102. The item data 120 may include other data. For example, the other data may comprise weight distribution of the item 112, point cloud data for the item 112, and so forth.

The physical layout data 122 may provide information indicative of where fixtures 102 are in the facility, location of sensors 128, information about sensor orientation and field of view (where applicable), and so forth. For example, the physical layout data 122 may comprise information representative of a map or floor plan of the facility with relative positions of fixtures 102, planogram data indicative of how types of items 112 are to be arranged at the fixtures 102, and so forth. In another example, the physical layout data 122 may comprise information indicating the particular placement of weight sensor assemblies 106 on a particular fixture 102.

The inventory management system 116 may include or have access to an analysis module 124. During operation, the analysis module 124 may access one or more of the weight data 118, the item data 120, the physical layout data 122, or other data to generate interaction data 126. For example, the facility may include other sensors 128, such as cameras having a field of view that includes at least a portion of the fixture 102 or another fixture. The sensors 128 generate sensor data, such as image data 130 from the camera. The interaction data 126 provides information about an interaction, such as a pick of an item 112 from the fixture 102, a place of an item 112 to the fixture 102, a touch made to an item 112 at the fixture 102, a gesture associated with an item 112 at the fixture 102, and so forth. The interaction data 126 may include one or more of the type of interaction, interaction location identifier indicative of the fixture 102 at which the interaction took place, an item identifier indicative of a type of item 112 or a particular item 112, quantity change to the item 112, user identifier, and so forth. The interaction data 126 may then be used to further update the item data 120. For example, the quantity of items 112 on hand at a particular partitioned area 110 on the fixture 102 may be changed based on an interaction that picks or places one or more items 112. Operation of the analysis module 124, including generation of the interaction data 126, is discussed in more detail below.

To determine interaction data 126 with the best accuracy, the analysis module 124 should be provided with accurate and timely weight data 118 that includes information about the distribution of weight on the platform 104.

The analysis module 124, or other modules, may perform event detection to determine if an event has taken place at the fixture 102. Events may include a pick or place of an item 112. One or more change detection algorithms may be used to identify when the weight values have changed in such a way as to meet or exceed a threshold value. In some implementations, as described below, a steady state weight value may be nulled out, and the weight sensor assembly 106 may provide weight data 118 upon a change in weight at the platform 104. An event may include weight data 118 that begins at a start time and continues through an end time.

Figure 2:
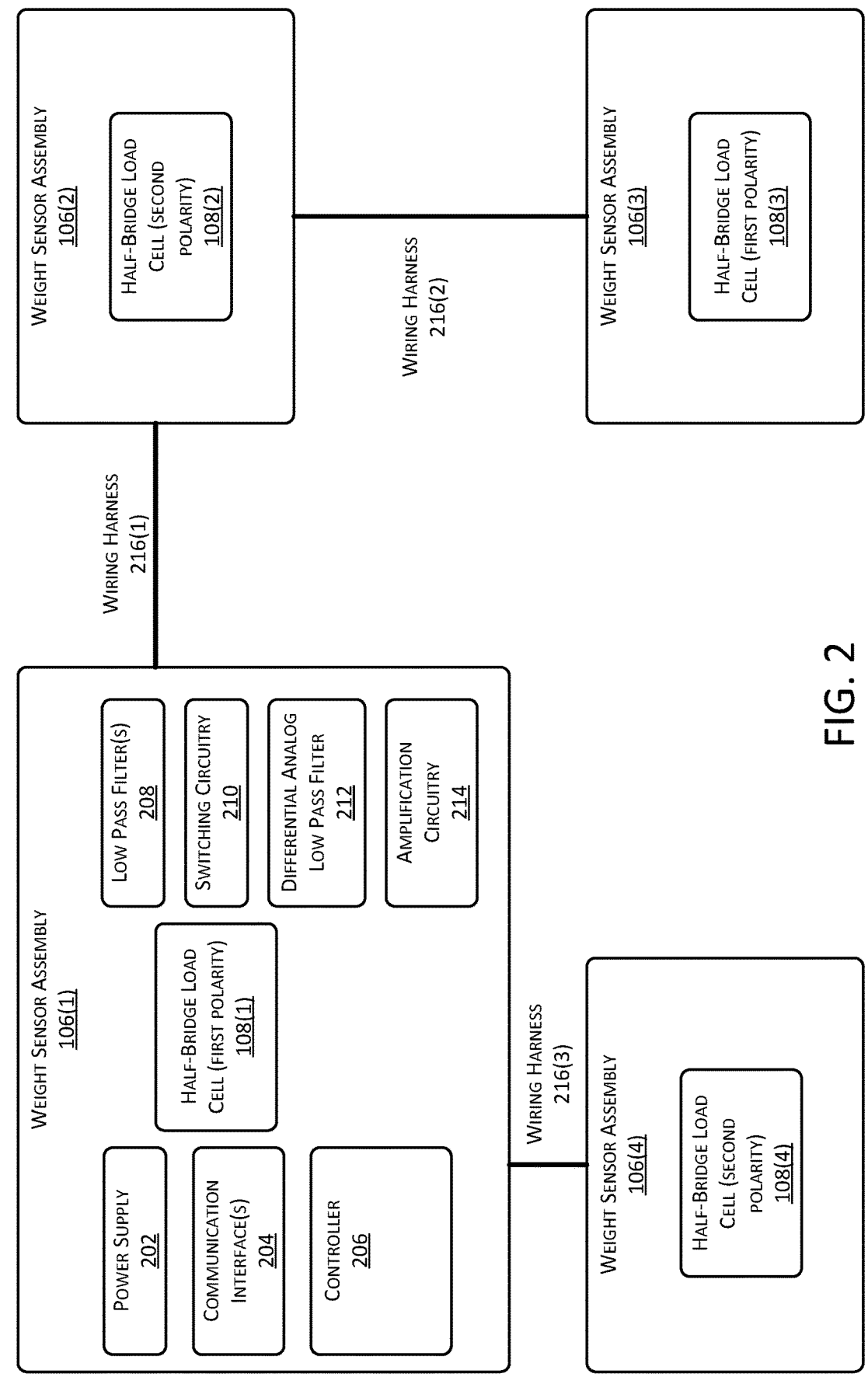
FIG. 2 is a block diagram of a set of four weight sensor assemblies used to determine weight changes on a platform of a fixture, according to some implementations.

FIG. 2 is a block diagram 200 of a set of four weight sensor assemblies 106(1)-(4) used to determine weight changes on a platform 104 of a fixture 102, according to some implementations.

The weight sensor assembly 106 may comprise a plurality of separate enclosures, each including a portion of the circuitry associated with operation. While four weight sensor assemblies 106(1)-(4) are shown associated with a platform 104, in other implementations other numbers of weight sensor assemblies 106 may be used. For example, additional pairs of weight sensor assemblies 106 with corresponding oppositely polarized HBLCs 108 may be added to provide additional data, support larger platforms 104, and so forth.

In another implementation, the HBLCs 108 and associated circuitry may be incorporated into a single unit. For example, a platform 104 and supporting hardware may incorporate the circuitry and arrangement of HBLCs 108 as described herein.

In the implementation depicted here, the weight sensor assembly 106(1) contains a power supply 202, communication interface(s) 204, controller 206, a HBLC 108(1), low pass filters 208, switching circuitry 210, differential analog low pass filter 212, amplification circuitry 214, and so forth. The weight sensor assemblies 106 operate in a set. For example, the set shown here includes weight sensor assemblies 106(1)-(4).

The power supply 202 provides electrical power suitable for operating the components in one or more of the weight sensor assemblies 106 in the set. The power supply 202 may comprise batteries, capacitors, fuel cells, photovoltaic cells, wireless power receivers, conductive couplings suitable for attachment to an external power source such as provided by an electric utility, and so forth.

The communication interfaces 204 enable the weight sensor assembly 106, or components thereof, to communicate with other devices or components. The communication interfaces 204 may include one or more I/O interfaces. The I/O interfaces may comprise Inter-Integrated Circuit (I2C), Serial Peripheral Interface bus (SPI), Universal Serial Bus (USB) as promulgated by the USB Implementers Forum, RS-232, and so forth. The communication interfaces 204 may include one or more network interfaces. The network interfaces may include devices configured to couple to personal area networks (PANs), local area networks (LANs), wireless local area networks (WLANS), wide area networks (WANs), and so forth. For example, the network interfaces may include devices compatible with Ethernet, Wi-Fi, Bluetooth, ZigBee, LTE, 5G, and so forth.

The controller 206 may comprise a processor, microcontroller, or other device. In one implementation the controller 206 may comprise a microcontroller in the STM32L452xx family from STMicroelectronics NV of Switzerland. The controller 206 may include a programmable processor that executes instructions, and may include other features such as an analog to digital converter (ADC), digital to analog converter (DAC), input/output lines to control the switching circuitry 210, and so forth.

The low pass filters 208 may comprise single ended low pass filters with a passband of 40 Hz. A separate low pass filter 208 may be used for each HBLC 108. For example, with four HBLCs 108(1)-(4) used in the implementation shown, four low pass filters 208(1)-(4) may be used. Output from the HBLC 108 is provided to an input of the low pass filter 208. Output from the low pass filter 208 is provided to an input for the switching circuitry 210.

The switching circuitry 210 is configured to selectively couple oppositely polarized pairs of HBLCs 108 to the inputs of the amplification circuitry 214. The switching circuitry 210 may be controlled by the controller 206. The switching circuitry 210 may comprise one or more switching elements. For example, the switching circuitry 210 may comprise a quad bilateral switch, such as the 74LVC4066 from Nexperia B.V. of the Netherlands.

The differential analog low pass filter 212 may be connected between the output from the switching circuitry 210 and the amplification circuitry 214. The differential analog low pass filter 212 may be configured to provide a −3 dB frequency of approximately 1.5 kHz. One implementation of the differential analog low pass filter 212 is depicted with regard to FIG. 4B. In other implementations the differential analog low pass filter 212 may be included in the controller 206, or may be omitted.

The amplification circuitry 214 may comprise an instrumentation amplifier comprising a differential amplifier which includes input buffer amplifiers. For example, the amplification circuitry 214 may comprise an INA317 from Texas Instruments, Inc. of the United States of America. One implementation of the amplification circuitry 214 is depicted with regard to FIG. 4B. In other implementations other amplifier configurations may be used. For example, the amplification circuitry 214 may include one or more of a differential amplifier or a single ended amplifier.

The weight sensor assemblies 106 in the set may be connected via a wiring harness 216. For example, the weight sensor assembly 106(1) is connected by wiring harness 216(1) to the weight sensor assembly 106(2). The weight sensor assembly 106(2) in turn is connected via wiring harness 216(2) to the weight sensor assembly 106(3). The weight sensor assembly 106(1) is connected via wiring harness 216(3) to the weight sensor assembly 106(4). In other implementations, other configurations may be used.

The wiring harnesses 216 may utilize connectors to establish an electrical connection with the electronics in the weight sensor assemblies 106 to which they connect. In implementations where the weight sensor assemblies 106 in a set are in separate enclosures, they may be arranged to support platforms 104 of different sizes. Wiring harnesses 216 with different lengths may be used to maintain connectivity between the weight sensor assemblies 106. For example, a set of weight sensor assemblies 106(1)-106(4) may be used to support a first platform 104(1) that is 60 cm wide and 40 cm deep or may be used to support a second platform 104(2) that is 80 cm wide and 30 cm deep.

This modularity allows the same weight sensor assembly 106 hardware to be used in conjunction with different sizes of platform 104 or with other types of stowage, such as bins or overhead hanging racks. Maintainability of the apparatus is also improved. In the event of a failure, the failed portion of the weight sensor assembly 106 set may be exchanged as a field replaceable unit.

Figure 3:
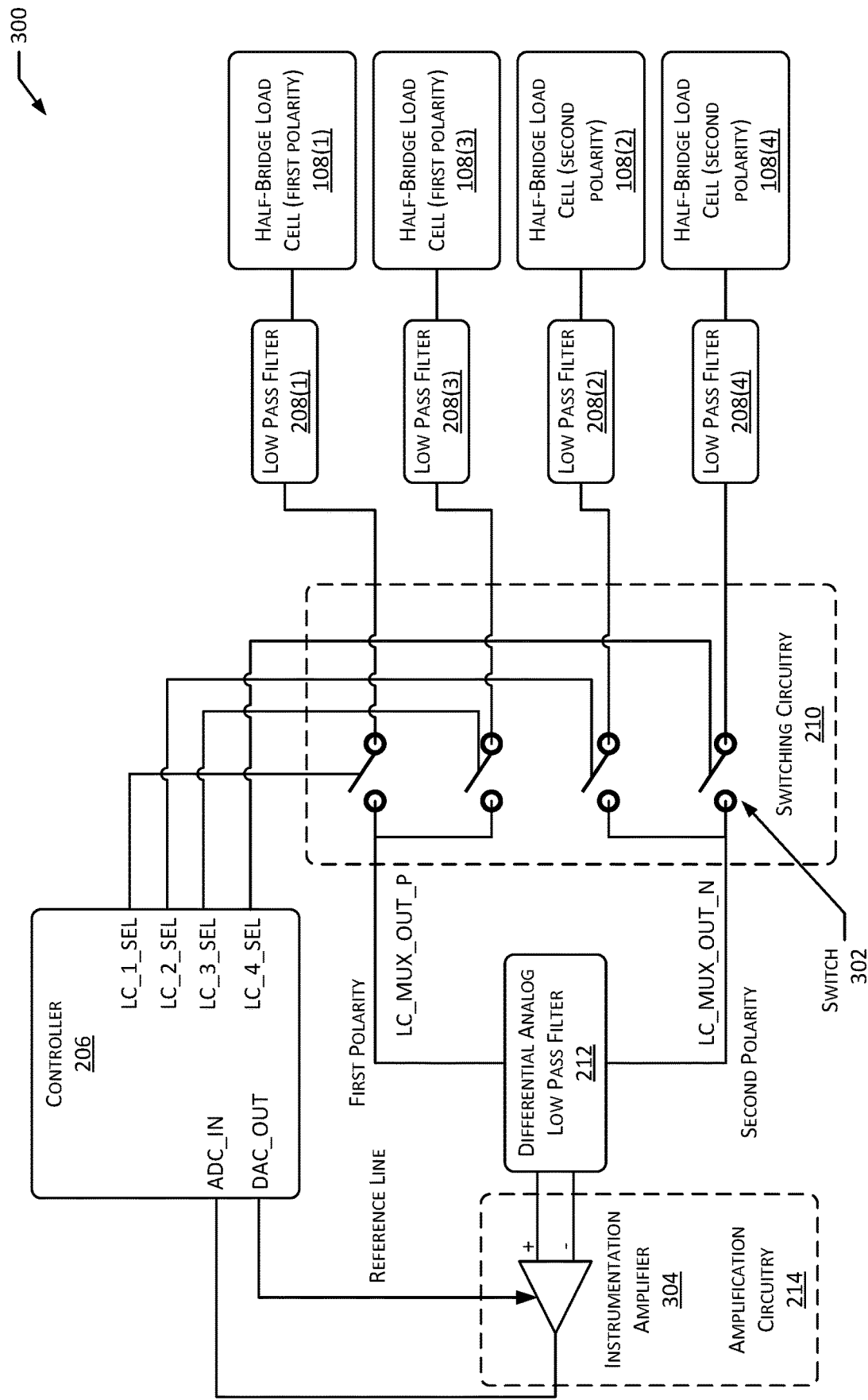
FIG. 3 is a block diagram of an overall system comprising the weight sensor assemblies that uses pairs of half-bridge load cells (HBLC), according to some implementations.

FIG. 3 is a block diagram 300 of an overall system comprising the weight sensor assemblies 106 that uses pairs of HBLCs 108, according to some implementations. In this diagram the controller 206 is depicted with four I/O lines LC_1_SEL associated with HBLC 108(1), LC_2_SEL associated with HBLC 108(2), LC_3_SEL associated with HBLC 108(3), and LC_4_SEL associated with HBLC 108(4). These individual I/O lines may operate as outputs, such as enable lines, and may be set to a high value (asserting a voltage greater than a threshold) to indicate selection of a particular HBLC 108 for use, or a low value (asserting a voltage less than the threshold) to indicate deselection of the particular HBLC 108 for use. Each of these select lines from the controller 206 may be connected to a corresponding select input of the switching circuitry 210. By asserting a voltage above a threshold on the select line, one or more switches 302 associated with an input to the switching circuitry 210 may be operated to provide an electrical connection between the input and an output of the switching circuitry 210. The switches 302 may comprise solid state devices, such as field-effect transistors. In this way, the switching circuitry 210 may be used to multiplex the outputs of specified pairs of HBLCs 108.

An output terminal from each of the HBLCs 108 may be connected to an input terminal of a low pass filter 208. The output terminal from the low pass filter 208 is connected to an input terminal of the switching circuitry 210.

The switching circuitry 210 has a first output terminal LC_MUX_OUT_P and second output terminal LC_MUX_OUT_N. The differential analog low pass filter 212 has two input terminals and two output terminals. The first output terminal of the switching circuitry 210 is connected to a first input terminal of the differential analog low pass filter 212. The second output terminal of the switching circuitry 210 is connected to a second input terminal of the differential analog low pass filter 212. A first output terminal of the differential analog low pass filter 212 is connected to a first input of the amplification circuitry 214. A second output terminal of the differential analog low pass filter 212 is connected to a second input of the amplification circuitry 214.

As described above, the amplification circuitry 214 may comprise an instrumentation amplifier 304. The first input terminal of the amplification circuitry 214 may comprise a positive input terminal of the instrumentation amplifier 304. The second input terminal of the amplification circuitry 214 may comprise a negative input terminal of the instrumentation amplifier 304. In other implementations, other types of amplifiers may be used.

A first output terminal of the instrumentation amplifier 304 may connect to the ADC_IN line of the controller 206. A reference terminal of the instrumentation amplifier 304 may connect to the DAC_OUT line of the controller 206.

During operation, the controller 206 operates the switching circuitry 210 to connect different pairs of HBLCs 108, each pair comprising a positively and negatively polarized HBLC 108, to the differential analog low pass filter 212. For example, every $1/480^{th}$ of a second the controller 206 may operate the switching circuitry 210 to connect a different pair of HBLCs 108. The ADC_IN receives the signal from the instrumentation amplifier 304, with the voltage of the signal indicative of the change in resistance imposed on the strain gauges within the paired HBLCs 108 at that time due to an imposed force, such as weight.

The ADC in the controller 206 converts the voltage on the ADC_IN line into an ADC value, that is a digital value representative of the voltage at the ADC_IN line. For example, the ADC may generate digital data comprising a 12 bit representation of the voltage at a given time. The digital data may then be processed to determine weight data 118. For example, a lookup table or function may be used to determine a weight value based on the digital data.

The weight sensor assembly 106 may be configured to report weight at a given time, or provide data indicative of a weight change only. For example, the system 100 may use information indicative of a weight change, such as how much the weight changed at different points on the platform 104 during operation.

In one implementation, the controller 206 may be configured to use the DAC to provide a signal at the DAC_OUT line to be used as a reference by the amplification circuitry 214. For example, while measuring during a first timeslot of a first measurement cycle a particular pair of HBLCs 108, the digital data provided by the ADC may be stored. During a later measurement cycle, during the first timeslot of that later measurement cycle, the digital data may be used by the DAC to provide a reference signal on the reference line. As a result, the output from the amplification circuitry 214 has been nulled out. If no weight change has been observed since the acquisition of the digital data by the ADC, the output from the amplification circuitry 214 would be a signal of 0 volts. However, a change in weight since that acquisition would result in a signal with a non-zero voltage at the output of the amplification circuitry 214.

By using the DAC_OUT to nullify the previous output of that pair of HBLCs in the amplification circuitry 214, the signal to noise ratio of the amplifier output provided to the ADC_IN line is improved. The conversion of that signal by the ADC is also improved. As a result, the quality of the digital data may be improved, resulting in an improved weight value.

In other implementations, nullification may be performed using the digital data provided by the ADC. For example, first digital data provided by the ADC at a first time may be stored and compared to second digital data provided by the ADC at a second time.

The ability to null out previous values and generate non-zero output only when a weight change is detected may be used to reduce the power consumption of the apparatus. For example, the controller 206 may compare the digital data from the ADC to determine if the output from the amplification circuitry 214 exceeds a threshold value. While the output is less than the threshold value, one or more portions of the apparatus may be maintained in a low power mode ("sleep"). When the output exceeds the threshold value, the one or more portions may be transitioned to a higher power mode. This also allows the apparatus to remain in a low power mode most of the time, minimizing overall power consumption and dissipation.

In some situations, a pair of HBLCs 108 may be operated to determine if a weight change has occurred. If the pair indicates a weight change, the controller 206 may proceed to scan through the other pairs and generate weight data 118. For example, the switching circuitry 210 may be operated at a first time to connect the first HBLC 108(1) and the second HBLC 108(2) to the amplification circuitry 214 every 100 milliseconds (ms). Output from the pair of HBLCs 108 may be used to determine a first value from the ADC at the first time. One or more portions of the apparatus may enter a low power mode. At a second time, such as a time interval determined by a realtime clock, counter, or other device, the first HBLC 108(1) and the second HBLC 108(2) may be transitioned to a higher power mode to determine a second value from the ADC. If a difference between the first value and the second value exceeds a threshold value, the controller 206 may proceed to operate to generate weight data 118. If the difference is less than the threshold value, the one or more portions of the apparatus may transition to the low power mode.

In another implementation, the second value may be compared to a second threshold value. If the second value exceeds the second threshold value, the apparatus may transition to the higher power mode. If the second value is less than or equal to the second threshold value, the apparatus may resume the low power mode.

The low power mode may include one or more of reducing a clock frequency, reducing a supply voltage, powering off one or more portions of the circuitry described herein, and so forth. For example, the low power mode may include turning of a USB communication interface or reducing a clock frequency of a processor in the controller 206.

The reduced power consumption also reduces the heat dissipation associated with operation of the apparatus. Reduced power consumption and associated heat dissipation is advantageous for operation of the facility by reducing the cooling load associated with maintaining a desired ambient temperature in the facility or a portion thereof. For example, by minimizing heat dissipation, the apparatus may be used within a freezer environment without substantially warming the freezer environment and increasing the load on the refrigeration system.

In other implementations, one or more portions of the circuitry described here may be included within a single device. For example, the controller 206 may have four analog inputs, each of which may be connected to an individual one of the HBLCs 108. These inputs may then be selectively switched with the output provided to an amplifier internal to the controller 206. In another example, the inputs may each be connected to an individual HBLC 108 and then sampled by one or more ADCs. The resulting digital output from the ADC(s) may then be used to determine the weight values.

In other implementations, transducers other than the HBLCs 108 may be used. For example, the transducers may provide information about an applied load with regard to changes in electrical capacitance, inductance, and so forth.

Figure 4A:
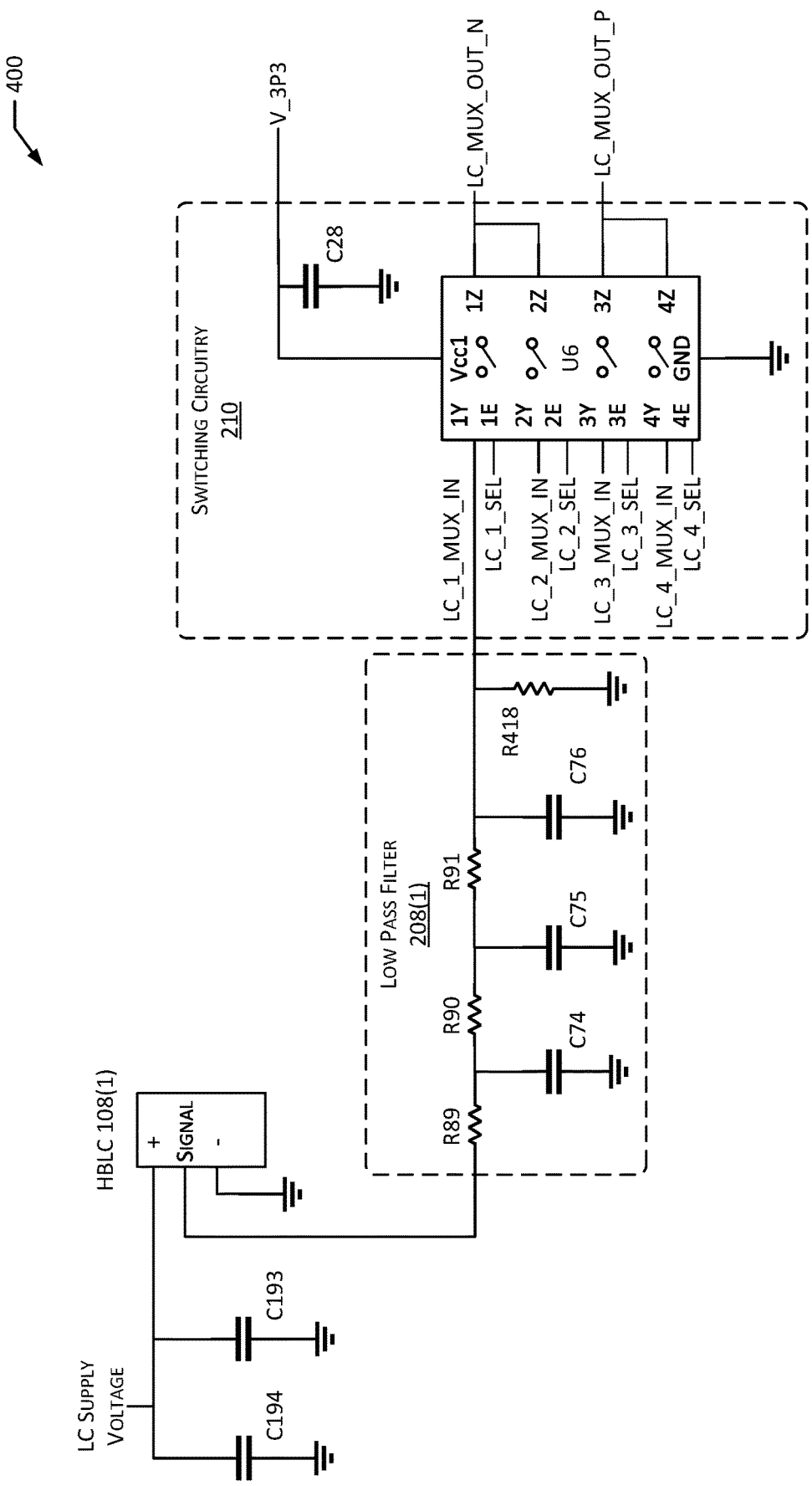
FIGS. 4A and 4B illustrate circuitry to selectively connect pairs of oppositely polarized HBLCs and generate output indicative of a weight as measured by the pair of HBLCs, according to some implementations.
Figure 4B:
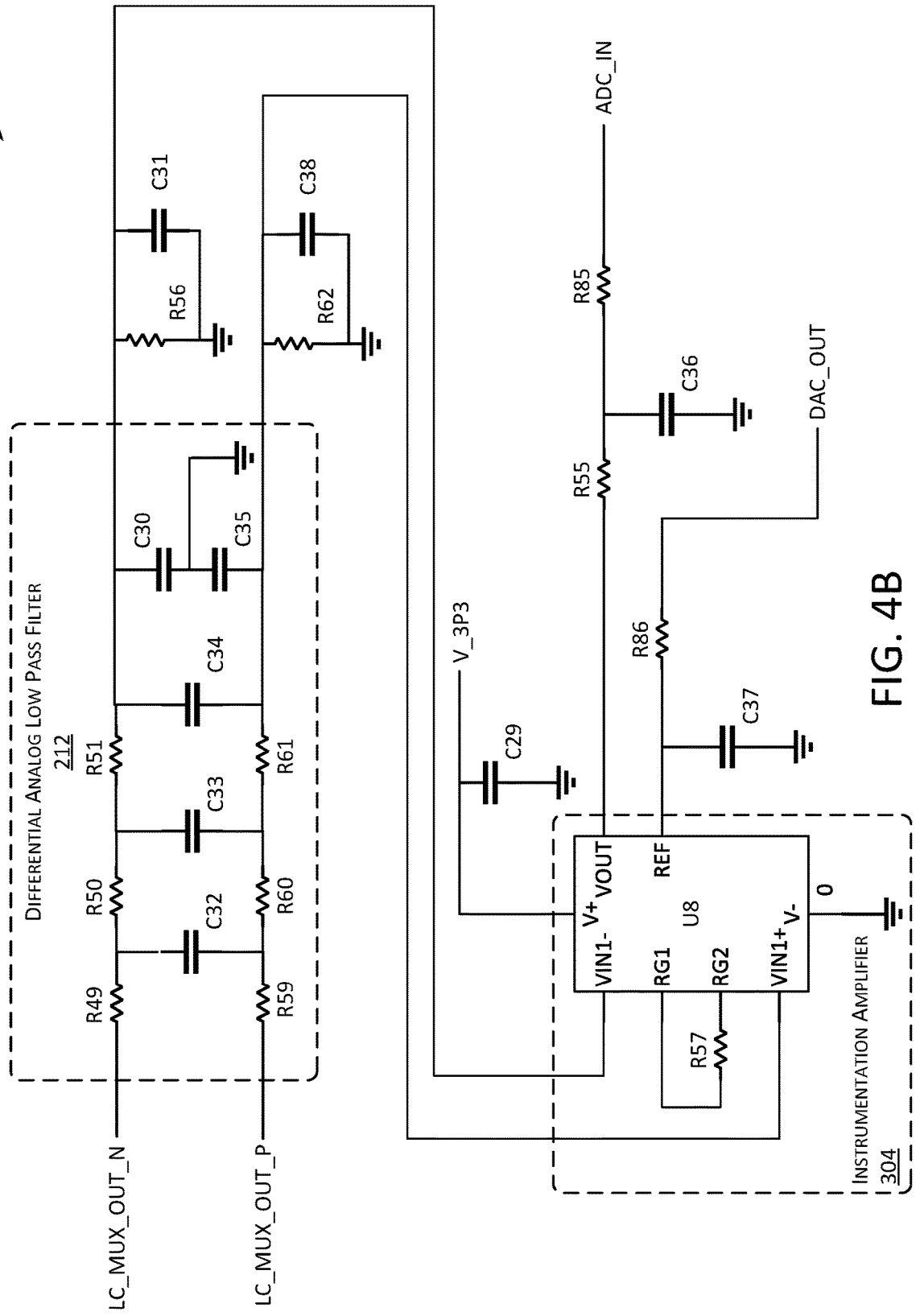

FIGS. 4A and 4B illustrate circuitry to selectively connect pairs of oppositely polarized HBLCs 108 and generate output indicative of a weight as measured by the pair of HBLCs 108, according to some implementations. FIG. 4A depicts a first one of the HBLCs 108(1) and the associated low pass filter 208(1) and connection to the switching circuitry 210. In this illustration, the HBLC 108(1) comprises a positive LC supply terminal, a negative LC supply terminal (or ground), and a signal terminal. The signal terminal is connected to an input of a first low pass filter 208(1). An output of the first low pass filter 208(1) is connected to a first signal input of the switching circuitry 210. In this illustration, the first HBLC 108(1) is connected to the LC_1_MUX_IN of quad bilateral switch U6.

The remaining three HBLCs 108(2)-(4) and their associated low pass filters 208(2)-(4) are omitted from this figure for clarity and not by way of a limitation. These HBLCs 108(2)-(4) may use similar circuitry, with their signal outputs passing through a respective low pass filter 208 and then into a respective signal input of the switching circuitry 210.

The switching circuitry 210 has a first output terminal LC_MUX_OUT_P and a second output terminal LC_MUX_OUT_N. At any given time, two oppositely polarized HBLCs 108 are connected to a respective output terminal.

Turning to FIG. 4B, the first output terminal of the switching circuitry 210 LC_MUX_OUT_P is connected to a first input terminal of the differential analog low pass filter 212. The second output terminal LC_MUX_OUT_N of the switching circuitry 210 is connected to a second input terminal of the differential analog low pass filter 212. A first output terminal of the differential analog low pass filter 212 is connected to a first input of the instrumentation amplifier 304. A second output terminal of the differential analog low pass filter 212 is connected to a second input of the instrumentation amplifier 304.

In another implementation the differential analog low pass filter 212 may be omitted. For example, the first output terminal of the switching circuitry 210 LC_MUX_OUT_P may be connected to the first input of the instrumentation amplifier 304. The second output terminal LC_MUX_OUT_N of the switching circuitry 210 may be connected to the second input of the instrumentation amplifier 304.

A first output terminal of the instrumentation amplifier 304 may connect to the ADC_IN line of the controller 206. A reference terminal of the instrumentation amplifier 304 may connect to the DAC_OUT line of the controller 206. As described above, this allows the controller 206 to null the output of the instrumentation amplifier 304.

The circuit diagrams described herein are provided by way of illustration, and not necessarily as a limitation. For example, other types of low pass filters, switching arrangements, and so forth may be used.

Figure 5:
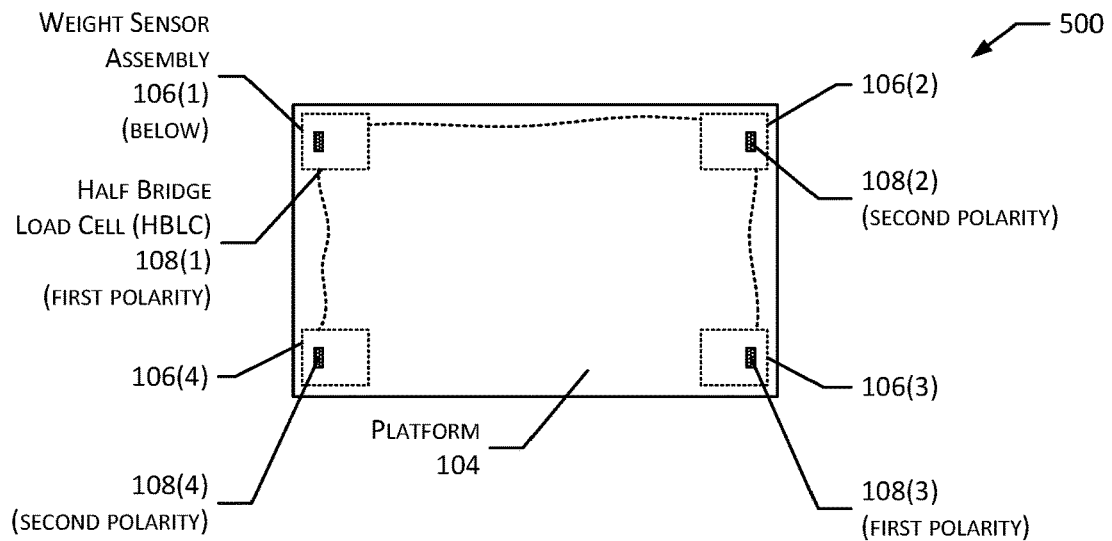
FIG. 5 illustrates pairing of oppositely polarized HBLCs at different times, according to some implementations.
Figure 5:
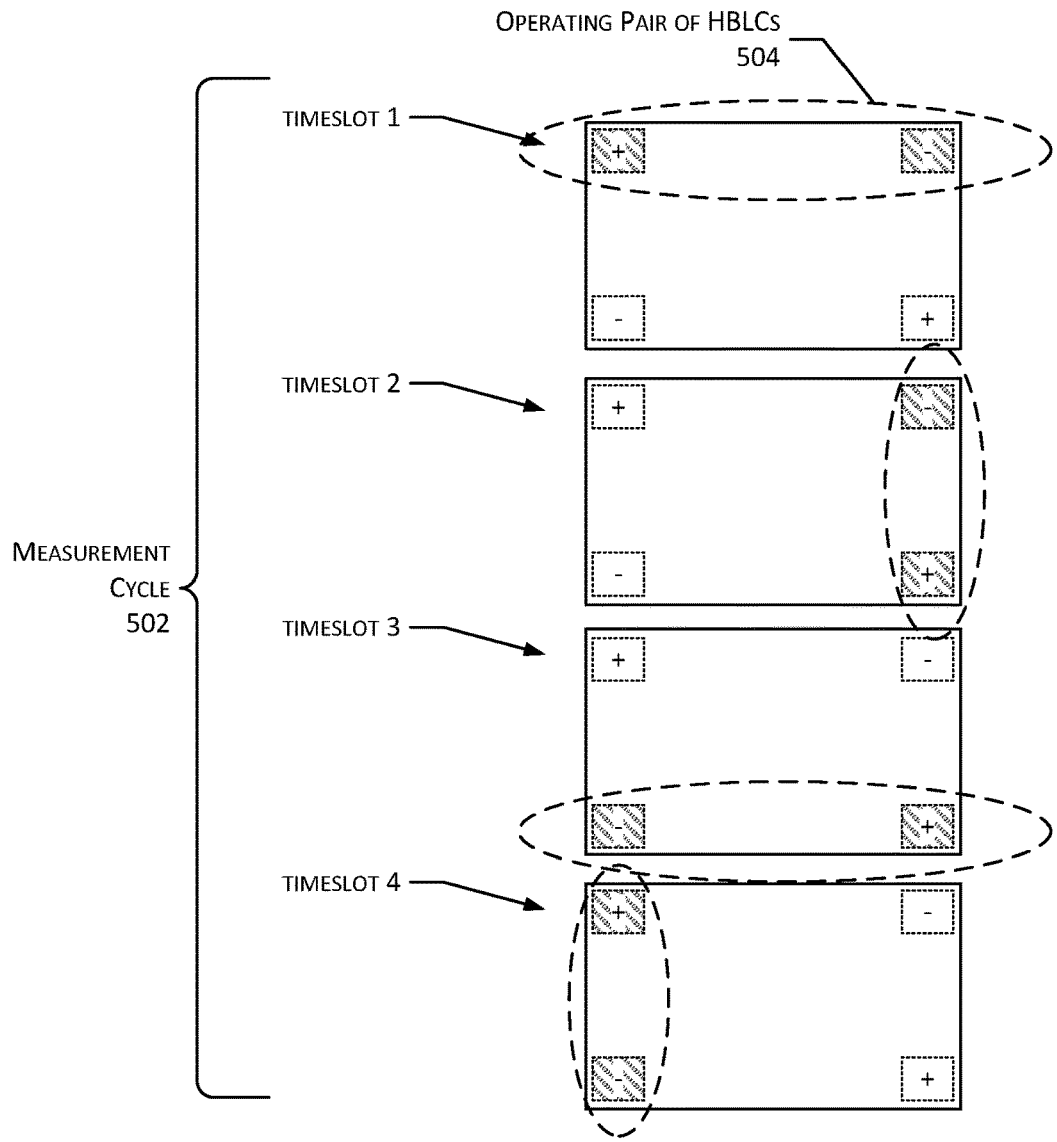

FIG. 5 illustrates pairing of oppositely polarized HBLCs 108 at different times, according to some implementations. In this implementation four HBLCs 108(1)-(4) are depicted, each arranged proximate to a corner of a platform 104. Adjacent HBLCs 108 which are those two HBLCs 108 closest to a same edge of the platform 104, exhibit opposite polarities. For example, where HBLC 108(1) is provided with a supply voltage of +4V at pin 1 and ground at pin 3, HBLC 108(2) may be provided with a supply voltage +4V at pin 3 and ground at pin 1. In other implementations the HBLCs 108 may be physically connected with the strain gauges arranged with different orientations to produce the opposing polarity.

In the implementation depicted here with four HBLCs 108(1)-(4), a measurement cycle 502 may comprise four timeslots. The controller 206 may be configured to manage the timing and transition between timeslots, including operating the switching circuitry 210 to provide the indicated pairings of HBLCs 108.

At timeslot 1, a first operating pair 504(1) of HBLCS 108(1) and 108(2) is operated. The operating pair 504 is indicated by shading. The polarity of each of the HBLCs is also depicted. A first weight value may be determined that is indicative of the weight of the platform 104 or a load on the platform 104 supported by the first operating pair 504(1) during the interval of time associated with timeslot 1.

The weight value determined by an operating pair 504 may be deemed to be indicative of the weight at a point on the platform 104 that is midway between the operating pair 504. For example, the first weight value may be indicative of a point midway between the HBLC 108(1) and HBLC 108(2).

In some implementations a slight delay may be implemented between applying power to the operating pair 504 and storing the digital data from the ADC. This delay may allow for settling of the circuit.

At timeslot 2, a second operating pair 504(2) of HBLCS 108(2) and 108(3) is operated. A second weight value may be determined that is indicative of the weight of the platform 104 or a load on the platform 104 supported by the second operating pair 504(2) during the interval of time associated with timeslot 2.

At timeslot 3, a third operating pair 504(3) of HBLCS 108(3) and 108(4) is operated. A third weight value may be determined that is indicative of the weight of the platform 104 or a load on the platform 104 supported by the third operating pair 504(3) during the interval of time associated with timeslot 3.

At timeslot 4, a fourth operating pair 504(4) of HBLCS 108(4) and 108(1) is operated. A fourth weight value may be determined that is indicative of the weight of the platform 104 or a load on the platform 104 supported by the fourth operating pair 504(4) during the interval of time associated with timeslot 4.

Once complete, the measurement cycle 502 may be repeated, acquiring additional weight values. The weight values obtained during a measurement cycle 502 may be summed to determine a total weight.

In an implementation using four HBLCs 108, each operating pair 504 of HBLCs 108 may be operated for $1/480^{th}$ of a second, with a measurement cycle 502 being completed every $1/120^{th}$ of a second. Weight values from a plurality of measurement cycles 502 may be averaged or otherwise processed to determine the weight data 118.

In other implementations other techniques may be used. For example, in some implementations each HBLC 108 may be connected to a respective ADC and the weight values may be obtained simultaneously.

Figure 6:
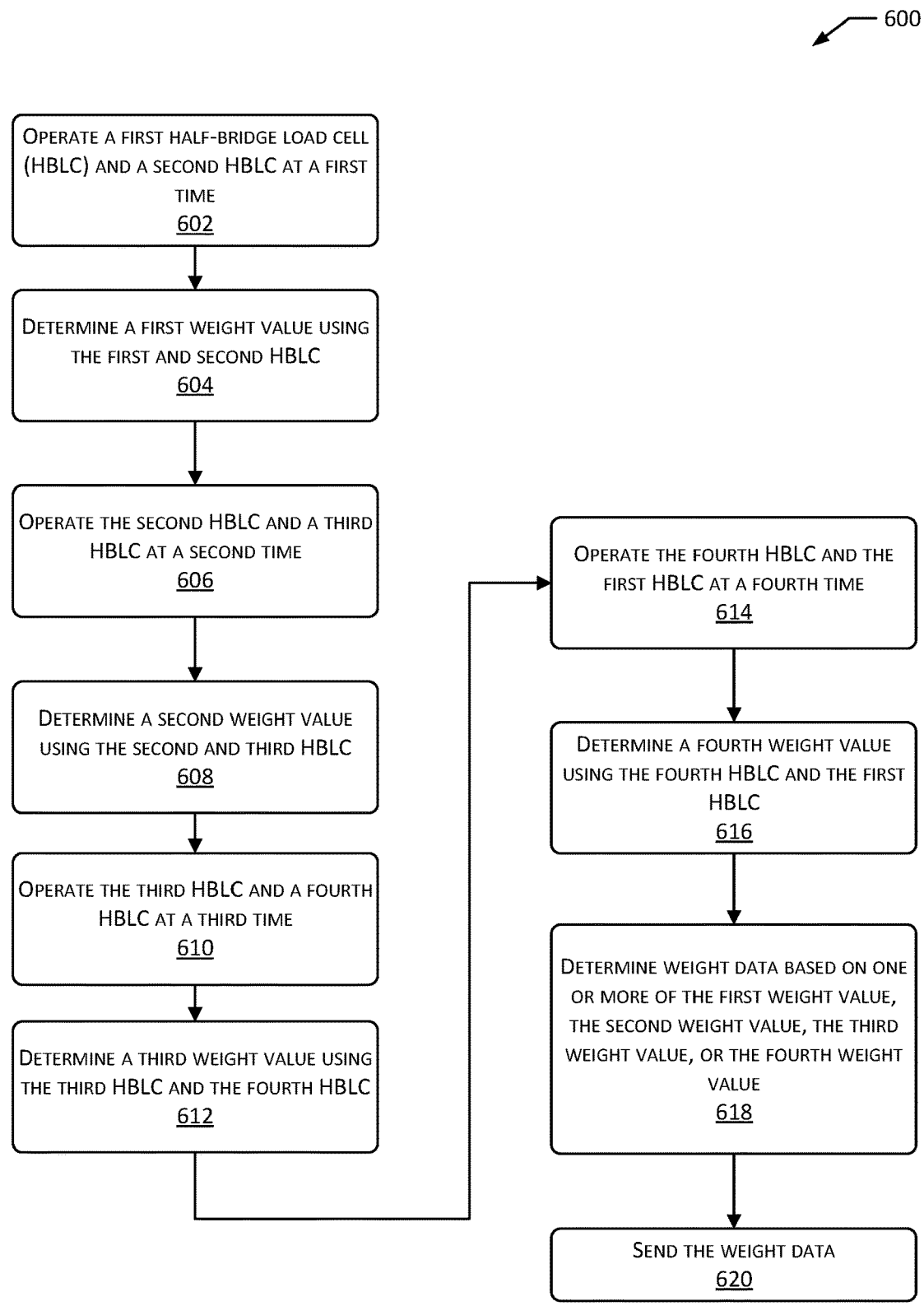
FIG. 6 is a flow diagram of a process to determine weight data using pairs of oppositely polarized HBLCs, according to some implementations.

FIG. 6 is a flow diagram of a process to determine weight data 118 using pairs of oppositely polarized HBLCs, according to some implementations. The process may be implemented at least in part by a weight sensor assembly 106.

At 602 at a first time a first HBLC 108(1) and a second HBLC 108(2) are operated. For example, the controller 206 may operate the switching circuitry 210 to connect HBLC 108(1) and 108(2) to the amplification circuitry 214.

At 604 a first weight value is determined using the first HBLC 108(1) and the second HBLC 108(2) which are operated together as a full-bridge load cell.

At 606 at a second time the second HBLC 108(2) and a third HBLC 108(3) are operated. For example, the controller 206 may operate the switching circuitry 210 to connect HBLC 108(2) and 108(3) to the amplification circuitry 214.

At 608 a second weight value is determined using the second HBLC 108(2) and the third HBLC 108(3) which are operated together as a full-bridge load cell.

At 610 at a third time the third HBLC 108(3) and a fourth HBLC 108(4) are operated. For example, the controller 206 may operate the switching circuitry 210 to connect HBLC 108(3) and 108(4) to the amplification circuitry 214.

At 612 a third weight value is determined using the third HBLC 108(3) and the fourth HBLC 108(4) which are operated together as a full-bridge load cell.

At 614 at a fourth time the fourth HBLC 108(4) and the first HBLC 108(1) are operated. For example, the controller 206 may operate the switching circuitry 210 to connect HBLC 108(4) and 108(1) to the amplification circuitry 214.

At 616 a fourth weight value is determined using the fourth HBLC 108(4) and the first HBLC 108(1) which are operated together as a full-bridge load cell.

At 618 weight data is determined based on one or more of the first weight value, the second weight value, the third weight value, or the fourth weight value. For example, the four weight values may be summed to determine a total weight. If the controller 206 was operated to nullify previous weights, a sum of the four weight values would be indicative of a total weight change.

In some implementations the weight data may comprise one or more of weight distribution or change in weight distribution. A weight distribution may comprise information indicative of the weights applied to the different pairs of HBLCs 108. For example, the weight distribution may be determined based on the first weight value, the second weight value, the third weight value, or the fourth weight value. Continuing the example, the weight distribution data may comprise information such as the weight values as associated with the respective pairs of HBLCs 108 or may be comprise a percentage value of the total weight. For example, the weight distribution data may indicate 0.57 of the total weight is associated with a first pair of HBLCs 108, 0.11 of the total weight is associated with a second pair of HBLCs 108, 0.23 of the total weight is associated with a third pair of HBLCs 108, and 0.09 of the total weight is associated with a fourth pair of HBLCs 108. In some implementations the weight distribution data may comprise information indicative of a weight distribution of a weight change. A change in weight between a first time and a second time may be determined for each pair of HBLCs 108. This change in weight may be associated with each pair. For example, for the four pairs of HBLCs 108, the weight changes may be +570 g, +110 g, +230 g, +9 g, respectively.

At 620 the weight data 118 is sent to another device. For example, the weight sensor assembly 106(1) may send the weight data 118 to a server using the communication interface 204.

Figure 7:
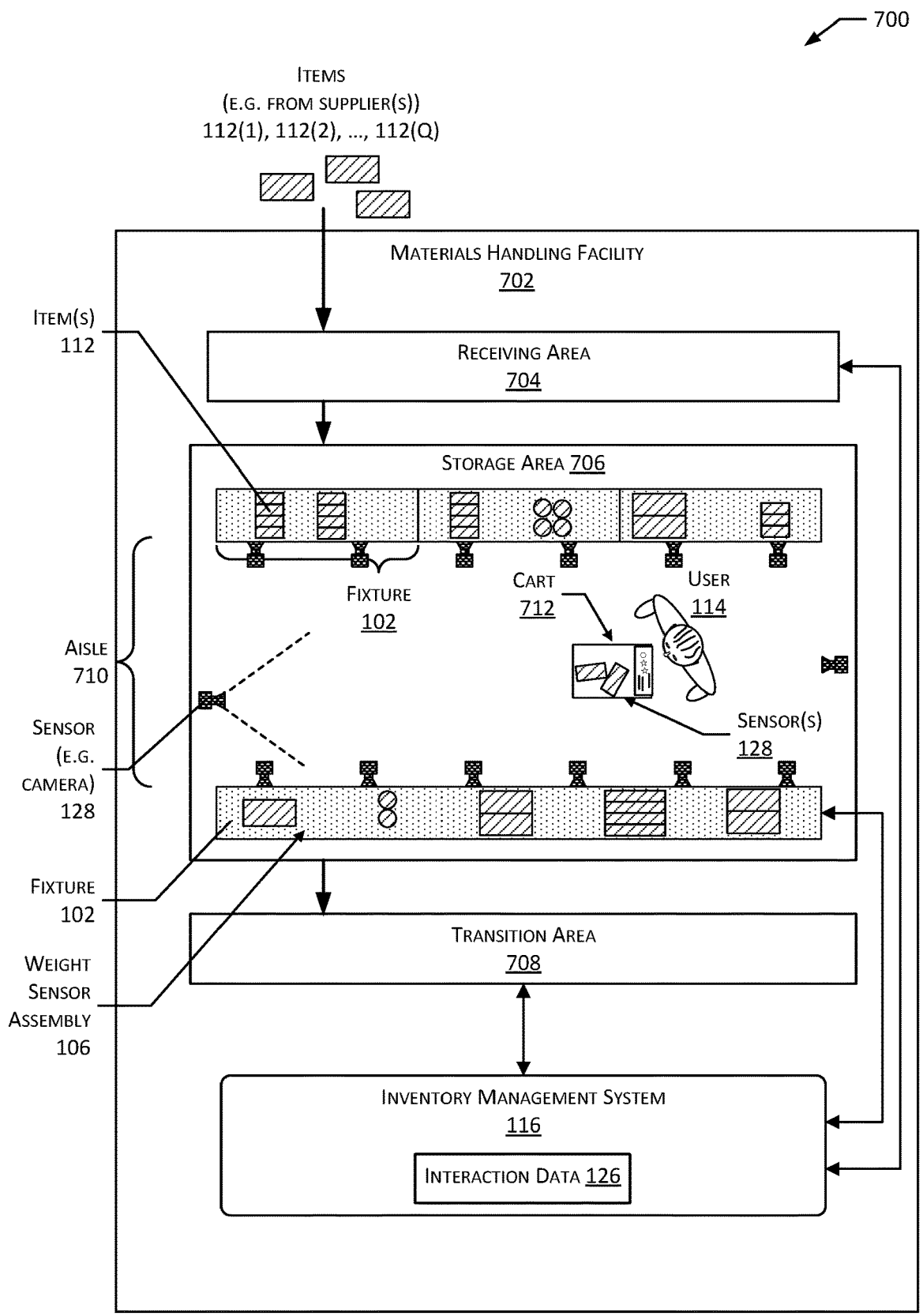
FIG. 7 is a block diagram illustrating a materials handling facility (facility) using the weight sensor assemblies, according to some implementations.

FIG. 7 is a block diagram 700 illustrating a material handling facility (facility) 702 using the system 100, according to some implementations. A facility 702 comprises one or more physical structures or areas within which one or more items 112(1), 112(2), . . . , 112(Q) may be held. The items 112 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 112, such as from suppliers, for intake into the facility 702. For example, the receiving area 704 may include a loading dock at which trucks or other freight conveyances unload the items 112. In some implementations, the items 112 may be processed, at the receiving area 704, to generate at least a portion of the item data 120. For example, an item 112 may be weighed, imaged or otherwise scanned to develop reference images or representations of the item 112 at the receiving area 704.

The storage area 706 is configured to store the items 112. The storage area 706 may be arranged in various physical configurations. In one implementation, the storage area 706 may include one or more aisles 710. The aisle 710 may be configured with, or defined by, fixtures 102 on one or both sides of the aisle 710. The fixtures 102 may include one or more of a platform 104, a rack, a case, a cabinet, a bin, or other suitable storage mechanisms for holding, supporting, or storing the items 112. For example, the fixtures 102 may comprise the platform 104 arranged in partitioned areas 110.

The fixtures 102 may be affixed to the floor or another portion of the structure of the facility 702. The fixtures 102 may also be movable such that the arrangements of aisles 710 may be reconfigurable. In some implementations, the fixtures 102 may be configured to move independently of an outside operator. For example, the fixtures 102 may comprise a rack with a power source and a motor, operable by a computing device to allow the rack to move from one location within the facility 702 to another.

One or more users 114(1), 114(2), . . . , 114(U) and carts 712(1), 712(2), . . . , 712(T) or other material handling apparatus may move within the facility 702. For example, the user 114 may move about within the facility 702 to pick or place the items 112 in various fixtures 102, placing them in the cart 712 for ease of transport. The cart 712 is configured to carry or otherwise transport one or more items 112. For example, the cart 712 may include a basket, cart, bag, bin, and so forth. In other implementations, other material handling apparatuses such as robots, forklifts, cranes, aerial drones, and so forth, may move about the facility 702 picking, placing, or otherwise moving the items 112. For example, a robot may pick an item 112 from a first fixture 102(1) and move the item 112 to a second fixture 102(2).

While the storage area 706 is depicted as having one or more aisles 710, fixtures 102 storing the items 112, sensors 128, and so forth, it is understood that the receiving area 704, the transition area 708, or other areas of the facility 702 may be similarly equipped. Furthermore, the arrangement of the various areas within the facility 702 are depicted functionally rather than schematically. For example, in some implementations, multiple different receiving areas 704, storage areas 706, and transition areas 708 may be interspersed rather than segregated in the facility 702.

The facility 702 may include, or be coupled to, the inventory management system 116 described above. The inventory management system 116 may be configured to interact with the user 114 or devices such as sensors 128, robots, material handling equipment, computing devices, and so forth, in one or more of the receiving area 704, the storage area 706, or the transition area 708.

During operation of the facility 702, the weight data 118 from the weight sensor assemblies 106, image data 130 from sensors 128 such as cameras 128(1), and so forth may be provided to the inventory management system 116. For example, the fixtures 102 may contain sets of weight sensor assemblies 106 to acquire weight data 118 of items 112 stowed therein, cameras 128(1) to acquire images of picking or placement of items 112 on shelves, and so forth. The sensors 128 are described in more detail below with regard to FIG. 8. The sensors 128 may be stationary or mobile, relative to the facility 702.

The inventory management system 116 or other systems may use data from the sensors 128 to track the location of objects within the facility 702, movement of the objects, or provide other functionality. Objects may include, but are not limited to, items 112, users 114, carts 712, and so forth. For example, a series of images acquired by the cameras 128(1) may indicate removal by the user 114 of an item 112 from a particular portion of the fixture 102 and placement of the item 112 on or at least partially within the cart 712.

The facility 702 may be configured to receive different kinds of items 112 from various suppliers and to store them until a customer orders or retrieves one or more of the items 112. A general flow of items 112 through the facility 702 is indicated by the arrows of FIG. 7. Specifically, as illustrated in this example, items 112 may be received from one or more suppliers, such as manufacturers, distributors, wholesalers, and so forth, at the receiving area 704. In various implementations, the items 112 may include merchandise, commodities, perishables, or any suitable type of item 112, depending on the nature of the enterprise that operates the facility 702.

Upon being received from a supplier at the receiving area 704, the items 112 may be prepared for storage in the storage area 706. For example, in some implementations, items 112 may be unpacked or otherwise rearranged. The inventory management system 116 may include one or more software applications executing on a computer system to provide inventory management functions. These inventory management functions may include maintaining information indicative of the type, quantity, condition, cost, location, weight, or any other suitable parameters with respect to the items 112. The items 112 may be stocked, managed, or dispensed in terms of countable units, individual units, or multiple units, such as packages, cartons, crates, pallets, or other suitable aggregations. Alternatively, some items 112, such as bulk products, commodities, and so forth, may be stored in continuous or arbitrarily divisible amounts that may not be inherently organized into countable units. Such items 112 may be managed in terms of a measurable quantity such as units of length, area, volume, weight, time, duration, or other dimensional properties characterized by units of measurement. Generally speaking, a quantity of an item 112 may refer to either a countable number of individual or aggregate units of an item 112 or a measurable amount of an item 112, as appropriate.

After arriving through the receiving area 704, items 112 may be stored within the storage area 706. In some implementations, like items 112 may be stored or displayed together in the fixtures 102 such as in bins, on shelves, hanging from pegboards, and so forth. In this implementation, all items 112 of a given kind are stored in one fixture 102. In other implementations, like items 112 may be stored in different fixtures 102. For example, to optimize retrieval of certain items 112 having frequent turnover within a large physical facility 702, those items 112 may be stored in several different fixtures 102 to reduce congestion that might occur at a single fixture 102.

When a customer order specifying one or more items 112 is received, or as a user 114 progresses through the facility 702, the corresponding items 112 may be selected or "picked" from the fixtures 102 containing those items 112. In various implementations, item picking may range from manual to completely automated picking. For example, in one implementation, a user 114 may have a list of items 112 they desire and may progress through the facility 702 picking items 112 from fixtures 102 within the storage area 706 and placing those items 112 into a cart 712. In other implementations, employees of the facility 702 may pick items 112 using written or electronic pick lists derived from customer orders. These picked items 112 may be placed into the cart 712 as the employee progresses through the facility 702.

After items 112 have been picked, the items 112 may be processed at a transition area 708. The transition area 708 may be any designated area within the facility 702 where items 112 are transitioned from one location to another or from one entity to another. For example, the transition area 708 may be a packing station within the facility 702. When the item 112 arrives at the transition area 708, the item 112 may be transitioned from the storage area 706 to the packing station. Information about the transition may be maintained by the inventory management system 116.

In another example, if the items 112 are departing the facility 702, a list of the items 112 may be obtained and used by the inventory management system 116 to transition responsibility for, or custody of, the items 112 from the facility 702 to another entity. For example, a carrier may accept the items 112 for transport with that carrier accepting responsibility for the items 112 indicated in the list. In another example, a user 114 may purchase or rent the items 112 and remove the items 112 from the facility 702. During use of the facility 702, the user 114 may move about the facility 702 to perform various tasks, such as picking or placing the items 112 in the fixtures 102.

To facilitate operation of the facility 702, the inventory management system 116 is configured to use the sensor data, such as data from the weight sensor assembly 106, image data 130, and other information such as item data 120, physical layout data 122, and so forth, to generate interaction data 126.

The interaction data 126 may provide information about an interaction, such as a pick of an item 112 from the fixture 102, a place of an item 112 to the fixture 102, a touch made to an item 112 at the fixture 102, a gesture associated with an item 112 at the fixture 102, and so forth. The interaction data 126 may include one or more of the type of interaction, interaction location identifier indicative of where from the fixture 102 the interaction took place, item identifier, quantity change to the item 112, user identifier, and so forth. The interaction data 126 may then be used to further update the item data 120. For example, the quantity of items 112 on hand at a particular fixture 102 may be changed based on an interaction that picks or places one or more items 112.

As described above, the inventory management system 116 may perform other operations, determining inventory to restock, determining user billing data, and so forth.

Figure 8:
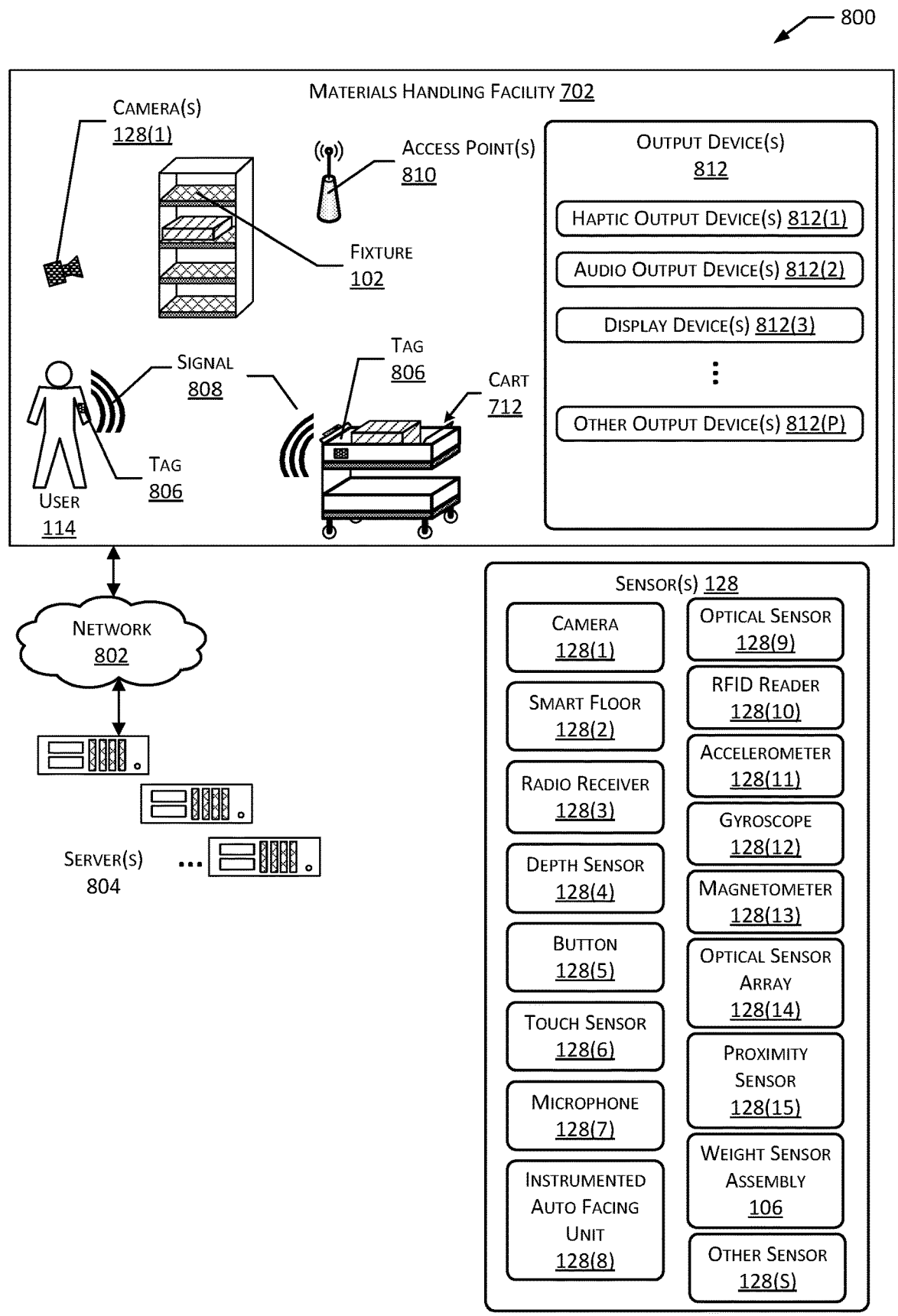
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more computing devices, such as servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 804 may be configured to execute one or more modules or software applications associated with the inventory management system 116 or other systems. While the servers 804 are illustrated as being in a location outside of the facility 702, in other implementations, at least a portion of the servers 804 may be located at the facility 702. The servers 804 are discussed in more detail below with regard to FIG. 9.

The user 114, the carts 712, items 112, or other objects in the facility 702 may be equipped with one or more tags 806.

The tags 806 may be configured to emit a signal 808. In one implementation, the tag 806 may be a radio frequency identification (RFID) tag 806 configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 116 may be configured to use the tags 806 for one or more of identification of the object, determining a location of the object, and so forth. For example, the user 114 may wear tags 806, the carts 712 may have tags 806 affixed, items 112 may have tags 806 affixed to their packaging, and so forth, which may be read and, based at least in part on signal strength, used to determine one or more of identity or location.

Generally, the inventory management system 116 or other systems associated with the facility 702 may include any number and combination of input components, output components, and servers 804.

The one or more sensors 128 may be arranged at one or more locations within the facility 702. For example, the sensors 128 may be mounted on or within a floor, wall, at a ceiling, at a fixture 102, on a cart 712, may be carried or worn by a user 114, and so forth.

The sensors 128 may include one or more cameras 128(1) or other imaging sensors. The one or more cameras 128(1) may include imaging sensors configured to acquire images of a scene. The cameras 128(1) are configured to detect light in one or more wavelengths including, but not limited to, terahertz, infrared, visible, ultraviolet, and so forth. The cameras 128(1) may comprise charge coupled devices (CCD), complementary metal oxide semiconductor (CMOS) devices, microbolometers, and so forth. The inventory management system 116 may use image data acquired by the cameras 128(1) during operation of the facility 702. For example, the inventory management system 116 may identify items 112, users 114, carts 712, and so forth, based at least in part on their appearance within the image data 130 acquired by the cameras 128(1). The cameras 128(1) may be mounted in various locations within the facility 702. For example, cameras 128(1) may be mounted overhead, on fixtures 102, may be worn or carried by the user 114, may be affixed to carts 712, and so forth.

The sensors 128 may include a smart floor 128(2). The smart floor 128(2) is able to provide information about the location of objects, such as a user 114, carts 712, and so forth. This information may include identifying the object, determining a location of the object, tracking the object, and so forth. The smart floor 128(2) may utilize smart floor devices that comprise one or more of transmitters or receivers that radiate or receive electromagnetic signals 808 from antennas located at or underneath the floor. Based on information about what antenna radiated a signal and what antenna acquired the signal, information about an object on or above the floor may be determined. For example, the smart floor 128(2) may comprise sensing elements, or segments. Each segment may include an antenna that is coupled to one or more of a transmitter or a receiver. During operation, the segment may transmit an electromagnetic signal 808 that is radiated by the antenna, receive an electromagnetic signal 808 that is acquired by the antenna, or both. In some implementations the smart floor 128(2) may operate as a physically large touch sensor that is deployed at floor level. The electromagnetic signals 808 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 128(2) may be used to provide object representation movement data. For example, the output from the segments obtained during a particular window of time may be processed in a fashion similar to the image data 130.

One or more radio receivers 128(3) may also be included as sensors 128. In some implementations, the radio receivers 128(3) may be part of transceiver assemblies. The radio receivers 128(3) may be configured to acquire RF signals 808 associated with RFID, Wi-Fi, Bluetooth, ZigBee, 4G, LTE, or other wireless data transmission technologies. The radio receivers 128(3) may provide information associated with data transmitted via radio frequencies, signal strength of RF signals 808, and so forth. For example, information from the radio receivers 128(3) may be used by the inventory management system 116 to determine a location of an RF source, such as a transmitter carried by the user 114, a transmitter on the cart 712, a tag 806 on the item 112, and so forth.

One or more depth sensors 128(4) may also be included in the sensors 128. The depth sensors 128(4) are configured to acquire spatial or three-dimensional (3D) data, such as depth information, about objects within a field-of-view (FOV). The depth sensors 128(4) may include range cameras, lidar systems, sonar systems, radar systems, structured light systems, stereo vision systems, optical interferometry systems, and so forth. The inventory management system 116 may use the 3D data acquired by the depth sensors 128(4) to identify objects, determine a location of an object in 3D real space, identify a user 114, and so forth.

One or more buttons 128(5) may be configured to accept input from the user 114. The buttons 128(5) may comprise mechanical, capacitive, optical, or other mechanisms. For example, the buttons 128(5) may comprise mechanical switches configured to accept an applied force from a touch of the user 114 to generate an input signal. The inventory management system 116 may use data from the buttons 128(5) to receive information from the user 114. For example, the cart 712 may be configured with a button 128(5) to accept input from the user 114 and send information indicative of the input to the inventory management system 116.

The sensors 128 may include one or more touch sensors 128(6). The touch sensors 128(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 116 may use data from the touch sensors 128(6) to receive information from the user 114. For example, the touch sensor 128(6) may be integrated with the cart 712 to provide a touchscreen with which the user 114 may select, from a menu, one or more particular items 112 for picking, enter a manual count of items 112 at a fixture 102, and so forth.

One or more microphones 128(7) may be configured to acquire information indicative of sound present in the environment. In some implementations, arrays of microphones 128(7) may be used. These arrays may implement beamforming techniques to provide for directionality of gain. The inventory management system 116 may use the one or more microphones 128(7) to acquire information from acoustic tags 806, accept voice input from the user 114, determine ambient noise level, and so forth.

The sensors 128 may include instrumented auto facing units (IAFUs) 128(8). The IAFU 128(8) may comprise a position sensor configured to provide data indicative of displacement of a pusher. As an item 112 is removed from the IAFU 128(8), the pusher moves, such as under the influence of a spring, and pushes the remaining items 112 in the IAFU 128(8) to the front of the fixture 102. By using data from the position sensor, and given item data 120 such as a depth of an individual item 112, a count may be determined, based on a change in position data. For example, if each item 112 is 1 inch deep, and the position data indicates a change of 10 inches, the quantity held by the IAFU 128(8) may have changed by 10 items 112. This count information may be used to confirm or provide a cross check for a count obtained by other means, such as analysis of the sensor data 926 from the weight sensor assembly 106.

The sensors 128 may include one or more optical sensors 128(9). The optical sensors 128(9) may be configured to provide data indicative of one or more of color or intensity of light impinging thereupon. For example, the optical sensor 128(9) may comprise a photodiode and associated circuitry configured to generate a signal 808 or data indicative of an incident flux of photons. As described below, the optical sensor array 128(14) may comprise a plurality of the optical sensors 128(9). The optical sensors 128(9) may include photodiodes, photoresistors, photovoltaic cells, quantum dot photoconductors, bolometers, pyroelectric infrared detectors, and so forth. For example, the optical sensor 128(9) may use germanium photodiodes to detect infrared light.

One or more radio frequency identification (RFID) readers 128(10), near field communication (NFC) systems, and so forth, may be included as sensors 128. For example, the RFID readers 128(10) may be configured to read the RF tags 806. Information acquired by the RFID reader 128(10) may be used by the inventory management system 116 to identify an object associated with the RF tag 806 such as the item 112, the user 114, the cart 712, and so forth. For example, based on information from the RFID readers 128(10) detecting the RF tag 806 at a particular inventory location, an item 112 being placed or picked may be determined.

The sensors 128 may include one or more accelerometers 128(11), which may be worn or carried by the user 114, mounted to the cart 712, and so forth. The accelerometers 128(11) may provide information such as the direction and magnitude of an imposed acceleration. Data such as rate of acceleration, determination of changes in direction, speed, and so forth, may be determined using the accelerometers 128(11).

A gyroscope 128(12) may provide information indicative of rotation of an object affixed thereto. For example, the cart 712 or other objects may be equipped with a gyroscope 128(12) to provide data indicative of a change in orientation of the object.

A magnetometer 128(13) may be used to determine an orientation by measuring ambient magnetic fields, such as the terrestrial magnetic field. The magnetometer 128(13) may be worn or carried by the user 114, mounted to the cart 712, and so forth. For example, the magnetometer 128(13) mounted to the cart 712 may act as a compass and provide information indicative of which direction the cart 712 is oriented.

An optical sensor array 128(14) may comprise one or optical sensors 128(9). The optical sensors 128(9) may be arranged in a regular, repeating, or periodic two-dimensional arrangement such as a grid. The optical sensor array 128(14) may generate image data 130. For example, the optical sensor array 128(14) may be arranged within or below a fixture 102 and obtain information about shadows of items 112, hand of the user 114, and so forth.

The sensors 128 may include proximity sensors 128(15) used to determine presence of an object, such as the user 114, the cart 712, and so forth. The proximity sensors 128(15) may use optical, electrical, ultrasonic, electromagnetic, or other techniques to determine a presence of an object. In some implementations, the proximity sensors 128(15) may use an optical emitter and an optical detector to determine proximity. For example, an optical emitter may emit light, a portion of which may then be reflected by the object back to the optical detector to provide an indication that the object is proximate to the proximity sensor 128(15). In other implementations, the proximity sensors 128(15) may comprise a capacitive proximity sensor 128(15) configured to provide an electrical field and determine a change in electrical capacitance due to presence or absence of an object within the electrical field.

The proximity sensors 128(15) may be configured to provide sensor data 926 indicative of one or more of a presence or absence of an object, a distance to the object, or characteristics of the object. An optical proximity sensor 128(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 128 such as a camera 128(1). Based on an apparent distance between the features of the structured light pattern, the distance to the object may be calculated. Other techniques may also be used to determine distance to the object. In another example, the color of the reflected light may be used to characterize the object, such as clothing, cart 712, and so forth.

The weight sensor assembly 106 is configured to measure the weight of a load. The weight sensor assembly 106 may be configured to measure the weight of the load at one or more of the fixtures 102, the cart 712, on the floor of the facility 702, and so forth, as described above.

In other implementations, other types of weight sensors may be used. These weight sensors may include one or more other sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the weight sensor may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 116 may use the data acquired by the weight sensor assembly 106 or other weight sensors to identify an object, determine a change in the quantity of objects, determine a location of an object, maintain shipping records, and so forth.

The sensors 128 may include other sensors 128(S) as well. For example, the other sensors 128(S) may include light curtains, ultrasonic rangefinders, thermometers, barometric sensors, hygrometers, and so forth.

In some implementations, the sensors 128 may include hardware processors, memory, and other elements configured to perform various functions. For example, the cameras 128(1) may be configured to generate image data 130, send the image data 130 to another device such as the server 804, and so forth.

The facility 702 may include one or more access points 810 configured to establish one or more wireless networks. The access points 810 may use Wi-Fi, NFC, Bluetooth, or other technologies to establish wireless communications between a device and the network 802. The wireless networks allow the devices to communicate with one or more of the sensors 128, the inventory management system 116, the tag 806, a communication device of the cart 712, or other devices.

Output devices 812 may also be provided in the facility 702. The output devices 812 are configured to generate signals 808, which may be perceived by the user 114 or detected by the sensors 128. In some implementations, the output devices 812 may be used to provide illumination of the optical sensor array 128(14).

Haptic output devices 812(1) are configured to provide a signal 808 that results in a tactile sensation to the user 114. The haptic output devices 812(1) may use one or more mechanisms such as electrical stimulation or mechanical displacement to provide the signal 808. For example, the haptic output devices 812(1) may be configured to generate a modulated electrical signal, which produces an apparent tactile sensation in one or more fingers of the user 114. In another example, the haptic output devices 812(1) may comprise piezoelectric or rotary motor devices configured to provide a vibration, which may be felt by the user 114.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 114 or detected by a light-sensitive sensor such as a camera 128(1) or an optical sensor 128(9). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located on fixtures 102, carts 712, on the floor of the facility 702, and so forth.

Other output devices 812(P) may also be present. For example, the other output devices 812(P) may include scent/odor dispensers, document printers, 3D printers or fabrication equipment, and so forth.

Figure 9:
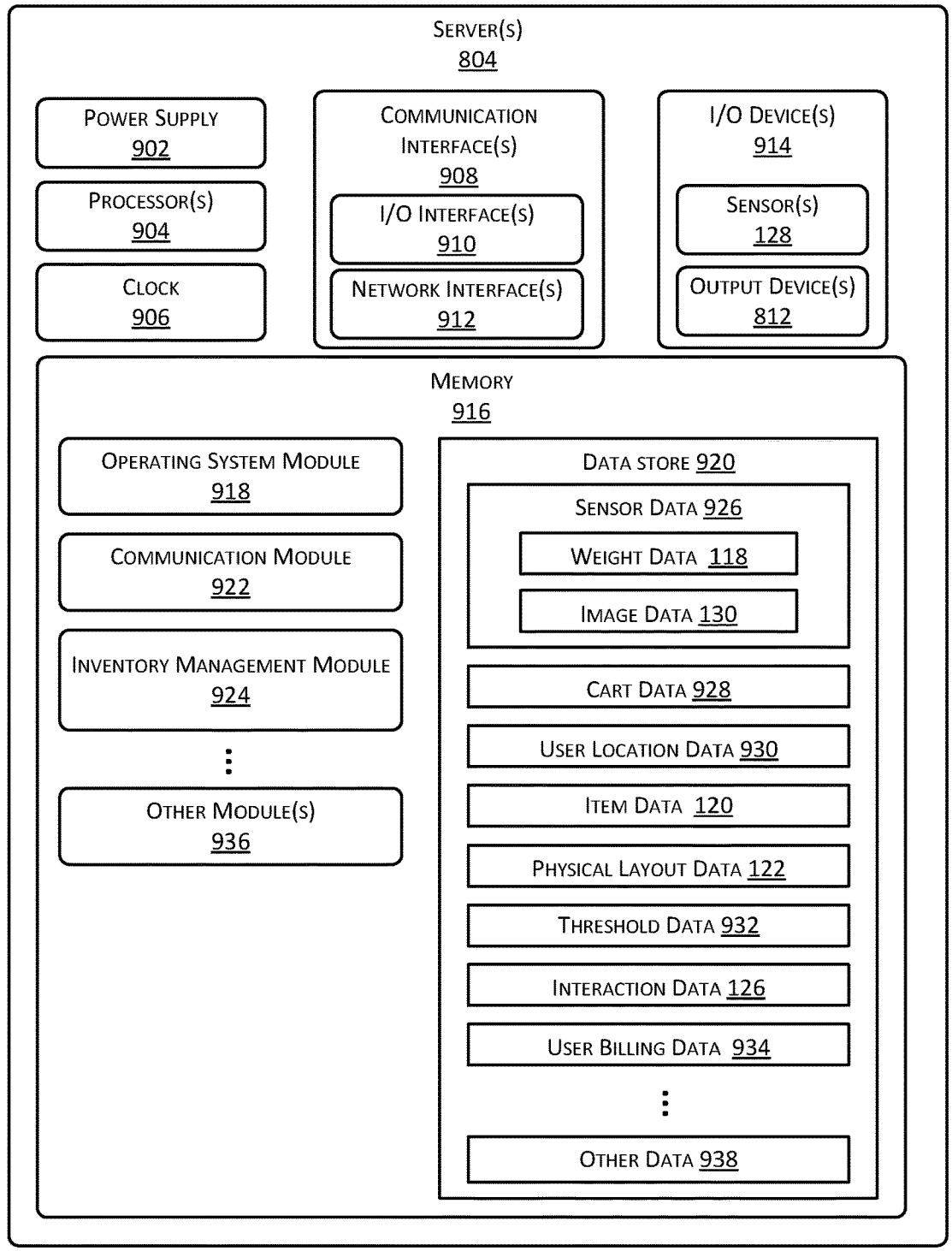
FIG. 9 is a block diagram of a server to support operation of the facility, according to some implementations.

FIG. 9 illustrates a block diagram 900 of a server 804 configured to support operation of the facility 702, according to some implementations. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 128, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, such as the carts 712, routers, access points 810, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including other servers 804, network attached storage devices, and so forth.

A communication module 922 may be configured to establish communications with the weight sensor assemblies 106, one or more of the carts 712, sensors 128, display devices 812(3), other servers 804, or other devices. The communications may be authenticated, encrypted, and so forth.

The memory 916 may store an inventory management module 924. The inventory management module 924 is configured to provide the inventory functions as described herein with regard to the inventory management system 116. For example, the inventory management module 924 may track items 112 between different fixtures 102, to and from the carts 712, generate restocking orders, direct operation of robots within the facility 702, and so forth. The inventory management module 924 may access sensor data 926 during operation. The sensor data 926 may comprise the weight data 118, image data 130, received data, and so forth.

Information used by the inventory management module 924 may be stored in the data store 920. For example, the data store 920 may be used to store the sensor data 926, cart data 928, user location data 930, item data 120, physical layout data 122, threshold data 932, interaction data 126, user billing data 934, and so forth.

The cart data 928 comprises information about the items 112 that are determined to be in the custody of the user 114. For example, the cart data 928 may indicate the items 112 that are within the cart 712 that is associated with the account of the user 114, currently being carried by the user 114, and so forth. The cart data 928 may be based at least in part on the interaction data 126. For example, the interaction data 126 may be associated with a particular user 114, changing the contents of the cart data 928 based on the interaction.

The inventory management module 924 may generate the user location data 930 that is indicative of the location of the user 114 within the facility 702. For example, the inventory management module 924 may use image data 130 obtained by the cameras 128(1) to determine a location of the user 114. In other implementations, other techniques may be used for determining the user location data 930. For example, data from the smart floor 128(2) may be used to determine the location of the user 114. Based on the user location data 930 and the interaction data 126, a particular interaction may be associated with an account of a particular user 114. For example, if the user location data 930 indicates that the user 114 is present in front of fixture 102(492) at time 17:47:20 and the interaction data 126 indicates a pick of a quantity of one item 112(D) from platform 104(7) of fixture 102(492) at 17:47:27, the user 114 may be billed for that pick.

The threshold data 932 comprises the various thresholds used by the system. For example, the threshold data 932 may specify values for confidence thresholds that are used to determine if a hypothesis is deemed suitable to be used to generate the interaction data 126.

The inventory management module 924 may generate user billing data 934 based on the cart data 928. For example, when a user 114 leaves the facility 702, the items in the cart data 928 and their respective quantities may be used to generate user billing data 934. In some implementations, the user billing data 934 may be used to bill a payment account associated with the user 114.

The inventory management module 924 may utilize the physical layout data 122 during operation. The physical layout data 122 may provide information indicative of where cameras 128(1), weight sensor assemblies 106, antennas for the radio receivers 128(3), fixtures 102, and so forth are in the facility 702 with respect to one another. For example, the physical layout data 122 may comprise information representative of a map or floor plan of the facility 702 with relative positions of fixtures 102, weight sensor assemblies 106, and cameras 128(1).

The inventory management module 924 may process the sensor data 926 and generate output data. For example, based on the interaction data 126, a quantity of a type of item 112 at a particular fixture 102 may drop below a threshold restocking level. The system may generate output data comprising a restocking order indicative of the fixture 102 and a quantity needed to replenish stock to a predetermined level. The restocking order may then be used to direct a robot to restock that fixture 102.

Other modules 936 may also be present in the memory 916 as well as other data 938 in the data store 920.

The implementations described above are provided for illustration, and not necessarily as limitations. For example, the fixtures 102 may support different numbers of platforms 104, combinations of different platforms on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. An apparatus comprising:
   a communication interface;
   a platform having a first corner, a second corner, a third corner, and a fourth corner;
   a first load cell coupled to the first corner of the platform, wherein the first load cell comprises a half-bridge load cell with a first polarity having a first output;
   a second load cell coupled to the second corner of the platform that is adjacent to the first corner, wherein the second load cell comprises a half-bridge load cell with a second polarity having a second output;
   a third load cell coupled to the third corner of the platform that is adjacent to the second corner, wherein the third load cell comprises a half-bridge load cell with the first polarity having a third output;
   a fourth load cell coupled to the fourth corner of the platform that is adjacent to the third corner, wherein the fourth load cell comprises a half-bridge load cell with the second polarity having a fourth output;
   a set of switching elements having:
      a first input connected to the first output;
      a second input connected to the second output;
      a third input connected to the third output;
      a fourth input connected to the fourth output;
      a fifth output that connects to either the first input or the third input; and
      a sixth output that connects to either the second input or the fourth input;
   an instrument amplifier having:
      a fifth input connected to the fifth output;
      a sixth input connected to the sixth output;
      a seventh input to receive a reference signal; and
      a seventh output to provide an amplified difference between the fifth input and the sixth input as adjusted by the reference signal; and
   electronic circuitry to:
      at a first time, determine a first weight value using the first load cell and the second load cell as a first full-bridge load cell;
      at a second time, determine a second weight value using the second load cell and the third load cell as a second full-bridge load cell;
      at a third time, determine a third weight value using the third load cell and the fourth load cell as a third full-bridge load cell;
      at a fourth time, determine a fourth weight value using the fourth load cell and the first load cell as a fourth full-bridge load cell;
      determine a change in weight value that exceeds a threshold value for one or more of the first weight value, the second weight value, the third weight value, or the fourth weight value; and
      send, using the communication interface, data indicative of a change in weight at the platform.

2. The apparatus of claim 1, further comprising:
   an analog to digital converter (ADC) having an eighth input connected to the seventh output of the instrument amplifier.

3. An apparatus comprising:
   a first half-bridge load cell (HBLC) operated with a first polarity and having a first output;
   a second HBLC adjacent to the first HBLC that is operated with a second polarity and having a second output;
   a third HBLC adjacent to the second HBLC that is operated with the first polarity and having a third output;
   a fourth HBLC is adjacent to the third HBLC that is operated with the second polarity and having a fourth output;
   a set of switching elements having:
      a first input connected to the first output;
      a second input connected to the second output;
      a third input connected to the third output;
      a fourth input connected to the fourth output;
      a fifth output that connects to either the first input or the third input; and
      a sixth output that connects to either the second input or the fourth input; and
   amplifier circuitry having:
      a fifth input connected to the fifth output;

a sixth input connected to the sixth output;
a seventh input to receive a reference signal; and
a seventh output to provide an amplified difference between the fifth input and the sixth input as adjusted by the reference signal, wherein the seventh output is connected to an eighth input of an analog to digital converter (ADC).

4. The apparatus of claim 3, further comprising:
a first low pass filter (LPF) between the first output and the first input;
a second LPF between the second output and the second input;
a third LPF between the third output and the third input;
a fourth LPF between the fourth output and the fourth input;
a differential analog low pass filter between:
  the fifth output and the fifth input, and
  the sixth output and the sixth input; and
the amplifier circuitry further comprising an instrumentation amplifier having a first input buffer amplifier, a second input buffer amplifier, and a third amplifier.

5. The apparatus of claim 3, the set of switching elements further comprising a quad bilateral switch having at least four inputs, wherein each input is connected to a controller.

6. The apparatus of claim 3, further comprising:
a microcontroller comprising:
  one or more outputs to control the set of switching elements;
  the ADC having the eighth input that is connected to the seventh output; and
  a digital to analog converter (DAC) having an eighth output that is connected to the seventh input.

7. The apparatus of claim 6, the microcontroller to operate the set of switching elements to:
connect at a first time, the first input to the fifth output and the second input to the sixth output;
connect at a second time, the first input to the fifth output and the fourth input to the sixth output;
connect at a third time, the third input to the fifth output and the second input to the sixth output; and
connect at a fourth time, the third input to the fifth output and the fourth input to the sixth output.

8. The apparatus of claim 6, further comprising:
the ADC having the eighth input that is connected to the seventh output; and
the microcontroller to:
  at a first time, operate the set of switching elements to connect the first input to the fifth output and the second input to the sixth output;
  determine a first value associated with the first time;
  determine a first ADC value from the ADC exceeds a threshold value;
  responsive to the first ADC value exceeding the threshold value, operate the set of switching elements to:
    connect at a second time, the first input to the fifth output and the fourth input to the sixth output;
    connect at a third time, the third input to the fifth output and the second input to the sixth output; and
    connect at a third time, the third input to the fifth output and the fourth input to the sixth output.

9. The apparatus of claim 6, the microcontroller to:
determine, at a first time associated with a particular pair of HBLCs being connected to the amplifier circuitry, a first ADC value indicative of output from the amplifier circuitry;
determine a second time that is associated with the particular pair of HBLCs being connected to the amplifier circuitry; and
generate, based on the first ADC value, the reference signal using the DAC during at least a portion of the second time.

10. The apparatus of claim 3, further comprising:
a first assembly comprising first electronics, wherein the first HBLC is attached to the first assembly;
a second assembly comprising second electronics, wherein the second HBLC is attached to the second assembly;
a third assembly comprising third electronics, wherein the third HBLC is attached to the third assembly;
a fourth assembly comprising fourth electronics, wherein the fourth HBLC is attached to the fourth assembly; and
one or more wires to connect one or more of the first electronics, the second electronics, the third electronics, or the fourth electronics.

11. The apparatus of claim 3, further comprising:
a platform having a first corner, a second corner, a third corner, and a fourth corner, wherein:
  the first HBLC is adjacent to the first corner;
  the second HBLC is adjacent to the second corner;
  the third HBLC is adjacent to the third corner; and
  the fourth HBLC is adjacent to the fourth corner.

12. The apparatus of claim 3, further comprising:
a power supply;
a wireless communication interface; and
electronics to:
  at a first time, determine a first weight value using the first HBLC and the second HBLC;
  at a second time, determine a second weight value using the second HBLC and the third HBLC;
  at a third time, determine a third weight value using the third HBLC and the fourth HBLC;
  at a fourth time, determine a fourth weight value using the fourth HBLC and the first HBLC;
  determine a change in one or more of the first weight value, the second weight value, the third weight value, or the fourth weight value with respect to a previous value; and
  responsive to the change in weight value exceeding a threshold value:
    transition the wireless communication interface from a first state to a second state, wherein the second state uses more electrical power than the first state, and
    send, using the wireless communication interface, one or more of the first weight value, the second weight value, the third weight value, the fourth weight value, or the change in weight value.

13. An apparatus comprising:
a first half-bridge load cell (HBLC) with a first polarity and having a first output;
a second HBLC with a second polarity and having a second output;
a third HBLC with the first polarity and having a third output;
a fourth HBLC with the second polarity and having a fourth output;
switching circuitry to:
  connect a fifth output to either the first output or the third output; and
  connect a sixth output to either the second output or the fourth output; and amplification circuitry comprising:
  a first input connected to the fifth output;
  a second input connected to the sixth output;
  a third input to receive a reference signal; and
  a seventh output to provide an amplified difference between the first input and the second input, wherein the seventh output is connected to a fourth input of an analog to digital converter (ADC).

14. The apparatus of claim 13, wherein:
the second HBLC is located adjacent to the first HBLC;
the third HBLC is located adjacent to the second HBLC;
the fourth HBLC is adjacent to the third HBLC; and
the first HBLC is adjacent to the fourth HBLC.

15. The apparatus of claim 13, further comprising:
a microcontroller comprising:
  one or more outputs to control the switching circuitry;
  the ADC having the fourth input that is connected to the seventh output; and
  a digital to analog converter (DAC) having an eighth output that is connected to the reference signal at the third input of the amplification circuitry.

16. The apparatus of claim 15, the microcontroller to operate the switching circuitry to:
  connect at a first time, the first output to the fifth output and the second output to the sixth output;
  connect at a second time, the first output to the fifth output and the fourth output to the sixth output;
  connect at a third time, the third output to the fifth output and the second output to the sixth output; and
  connect at a fourth time, the third output to the fifth output and the fourth output to the sixth output.

17. The apparatus of claim 15, further comprising:
the ADC having the fourth input that is connected to the seventh output; and
the microcontroller to:
  at a first time, operate the switching circuitry to connect the first output to the fifth output and the second output to the sixth output;
  determine a first ADC value, from the ADC, associated with the first time;
  determine the first ADC value exceeds a threshold value;
  responsive to the first ADC value exceeding the threshold value, operate the switching circuitry to:
    connect at a second time, the first output to the fifth output and the fourth output to the sixth output;
    connect at a third time, the third output to the fifth output and the second output to the sixth output; and
    connect at a fourth time, the third output to the fifth output and the fourth output to the sixth output.

18. The apparatus of claim 15, the microcontroller to:
determine, at a first time associated with a particular pair of HBLCs being connected to the amplification circuitry, a first ADC value indicative of output from the amplification circuitry;
determine a second time that is associated with the particular pair of HBLCs being connected to the amplification circuitry; and
generate, based on the first ADC value, the reference signal using the DAC during at least a portion of the second time.

19. The apparatus of claim 13, further comprising:
a first assembly comprising first electronics, wherein the first HBLC is attached to the first assembly;
a second assembly comprising second electronics, wherein the second HBLC is attached to the second assembly;
a third assembly comprising third electronics, wherein the third HBLC is attached to the third assembly;
a fourth assembly comprising fourth electronics, wherein the fourth HBLC is attached to the fourth assembly; and
one or more wires to connect one or more of the first electronics, the second electronics, the third electronics, or the fourth electronics.

20. The apparatus of claim 13, further comprising:
a platform having a first corner, a second corner, a third corner, and a fourth corner, wherein:
  the first HBLC is adjacent to the first corner;
  the second HBLC is adjacent to the second corner;
  the third HBLC is adjacent to the third corner; and
  the fourth HBLC is adjacent to the fourth corner.

21. The apparatus of claim 13, further comprising:
a power supply;
a wireless communication interface; and
electronics to:
  at a first time, determine a first weight value using the first HBLC and the second HBLC;
  at a second time, determine a second weight value using the second HBLC and the third HBLC;
  at a third time, determine a third weight value using the third HBLC and the fourth HBLC;
  at a fourth time, determine a fourth weight value using the fourth HBLC and the first HBLC;
  determine a change in weight distribution between one or more of the first HBLC, the second HBLC, the third HBLC, or the fourth HBLC; and
  responsive to the change in weight distribution:
    transition the wireless communication interface from a first state to a second state, wherein the second state uses more electrical power than the first state, and
    send, using the wireless communication interface, one or more of the first weight value, the second weight value, the third weight value, the fourth weight value, or data indicative of the change in weight distribution.

* * * * *

UNITED STATES PATENT AND TRADEMARK OFFICE
CERTIFICATE OF CORRECTION

PATENT NO. : 11,346,703 B1
APPLICATION NO. : 16/588886
DATED : May 31, 2022
INVENTOR(S) : Dan Beltzer et al.

It is certified that error appears in the above-identified patent and that said Letters Patent is hereby corrected as shown below:

In the Claims

Column 29, Claim 8, Line 61:
Currently reads "connect at a third time,"
Where it should read --connect at a fourth time,--.

Signed and Sealed this
Fifth Day of July, 2022

*Katherine Kelly Vidal*
Katherine Kelly Vidal
*Director of the United States Patent and Trademark Office*